United States Patent
Fischer et al.

(10) Patent No.: US 10,192,041 B2
(45) Date of Patent: Jan. 29, 2019

(54) METHODS AND SYSTEMS FOR AUTHENTICATION USING ZERO-KNOWLEDGE CODE

(71) Applicant: NAGRAVISION S.A., Cheseaux-sur-Lausanne (CH)

(72) Inventors: Nicolas Fischer, Versoix (CH); Laurent Gauteron, Evian (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 162 days.

(21) Appl. No.: 14/861,776

(22) Filed: Sep. 22, 2015

(65) Prior Publication Data

US 2017/0083690 A1    Mar. 23, 2017

(51) Int. Cl.
*H04L 9/32* (2006.01)
*G06F 21/00* (2013.01)
(Continued)

(52) U.S. Cl.
CPC .............. *G06F 21/31* (2013.01); *G06F 21/00* (2013.01); *G06F 21/36* (2013.01); *H04L 9/3218* (2013.01);
(Continued)

(58) Field of Classification Search
CPC ......... G06F 21/31; G06F 21/36; H04L 47/70; H04L 63/0853; H04L 63/10; H04W 12/06; H04W 12/08
See application file for complete search history.

(56) References Cited

U.S. PATENT DOCUMENTS 7,813,715 B2 * 10/2010 McKillop ............. G06F 21/445
455/410
9,390,256 B2 * 7/2016 Jakobsson ............... G06F 21/45
(Continued)

OTHER PUBLICATIONS

Menzes, et al., "Handbook of Applied Cryptography", Jan. 1, 1997, CRC Press LLC, USA, XP55311651, p. 20-22, 192-194, 405-406.
(Continued)

*Primary Examiner* — Tae K Kim
*Assistant Examiner* — Louis C Teng
(74) *Attorney, Agent, or Firm* — Oblon, McClelland, Maier & Neustadt, L.L.P.

(57) ABSTRACT

Disclosed herein are methods and systems for authentication using zero-knowledge code. One embodiment takes the form of a process that includes detecting an accessory-access-request event associated with a trusted accessory. The process includes generating a seed sequence having a first number of seed-sequence elements. The process includes outputting an indication of at least one seed-sequence element. The process includes receiving at least one seed-sequence-element-modifier signal for at least one of the seed-sequence elements. The process includes modifying the generated seed sequence in accordance with the at least one received seed-sequence-element-modifier signal. The process includes comparing the modified seed sequence with a stored access sequence. The process includes granting operational access to the trusted accessory when the modified seed sequence matches the stored access sequence. The process includes denying operational access to the trusted accessory when the modified seed sequence does not match the stored access sequence.

19 Claims, 15 Drawing Sheets

(51) Int. Cl.
*G06F 21/31* (2013.01)
*G06F 21/36* (2013.01)
*H04L 29/06* (2006.01)
*H04W 12/06* (2009.01)
*H04W 12/08* (2009.01)
*H04L 12/911* (2013.01)

(52) U.S. Cl.
CPC .............. *H04L 47/70* (2013.01); *H04L 63/08* (2013.01); *H04L 63/10* (2013.01); *H04W 12/06* (2013.01); *H04W 12/08* (2013.01)

(56) References Cited

U.S. PATENT DOCUMENTS

| | | | | |
|---|---|---|---|---|
| 9,480,096 | B1* | 10/2016 | Lee | H04W 8/005 |
| 2004/0073795 | A1* | 4/2004 | Jablon | H04L 9/0844 |
| | | | | 713/171 |
| 2007/0150415 | A1* | 6/2007 | Bundy | H04L 9/0866 |
| | | | | 705/51 |
| 2008/0057890 | A1* | 3/2008 | McKillop | G06F 21/445 |
| | | | | 455/185.1 |
| 2011/0055568 | A1* | 3/2011 | Farrugia | H04L 9/321 |
| | | | | 713/170 |
| 2012/0083209 | A1* | 4/2012 | Giles | H04W 4/206 |
| | | | | 455/41.2 |
| 2013/0247173 | A1* | 9/2013 | Jakobsson | G06F 21/45 |
| | | | | 726/18 |
| 2013/0276103 | A1* | 10/2013 | Rautenbach | G06F 21/34 |
| | | | | 726/19 |
| 2015/0026785 | A1 | 1/2015 | Soon-Shiong | |
| 2016/0285857 | A1* | 9/2016 | Jakobsson | G06F 21/45 |

OTHER PUBLICATIONS

International Search Report and Written Opinion of the International Searching Authority for PCT/EP2016/069363, dated Oct. 27, 2016, 9 pages.

Written Opinion dated Oct. 12, 2018 in Singapore Application No. 11201801673X (in patent family of U.S. Appl. No. 14/861,776).

* cited by examiner

METHODS AND SYSTEMS FOR AUTHENTICATION USING ZERO-KNOWLEDGE CODE

BACKGROUND

Accessories for mobile phones and portable computers are quite prevalent and pervasive in modern society, and are becoming more so all the time. Moreover, developments in security, communication protocols, and accessories (e.g., Bluetooth headsets, smartwatches, virtual-reality headsets and the like), along with developments in other computing disciplines, have collectively enabled and facilitated the means for a variety of accessory-device-connection protocols. The variety of protocols encompasses both wired and wireless protocols, examples of which include the Universal Serial Bus (USB) standard, the High Definition Multimedia Interface (HDMI) standard, the WiFi standard, the Bluetooth standard, and of course many other communication protocols could be listed by those with skill in the relevant art as well. Indeed, the link between an accessory and a device is often a focus for the optimization of desired functionality, however it is also a commonly used source of vulnerability for malicious users and programs.

When transmitting or receiving data over a communication protocol it is often the case that at least some security measures are taken. Many forms of data encryption exist today and the use of such techniques is ubiquitous. Furthermore, at least some security measures are commonly taken when first establishing a connection over a communication protocol. When connecting a Bluetooth-enabled device to a Bluetooth accessory, the user is often prompted to enter in a 4-digit pin on their device as a verification means. When connecting to a WiFi network, the user is often prompted to enter in a security key on their device as a verification means. These initial verification means are important for at least the reason that they help ensure connections are established between the correct parties.

OVERVIEW

Improvements over the above-described developments have recently been realized by technology that, among other capabilities and features, provides a zero-trust-required authentication means for initializing a connection between a device (e.g., an untrusted device) and an accessory (e.g., a trusted accessory). This disclosure describes systems and methods for authentication using zero-knowledge code. Such systems and methods are useful for scenarios in which a trusted accessory forms a connection with an untrusted device, or vice versa. The present systems and methods facilitate improved security by preventing the untrusted device from obtaining any indication of an access sequence of the trusted accessory (e.g., unique PIN, color sequence, security image, etc.). The trusted accessory may be an accessory in which data passing through it, received by it, or transmitted by it is considered to be secure. The untrusted device may be a device in which data passing through it is not considered to be secure.

One embodiment of the systems and methods disclosed herein takes the form of a process. The process includes detecting an accessory-access-request event associated with a trusted accessory. The process also includes generating a seed sequence having a first number of seed-sequence elements. The process also includes outputting an indication of at least one seed-sequence element via a user interface of the trusted accessory. The process also includes receiving at least one seed-sequence-element-modifier signal for at least one of the seed-sequence elements. The process also includes modifying the generated seed sequence in accordance with the at least one received seed-sequence-element-modifier signal. The process also includes comparing the modified seed sequence with a stored access sequence. The process also includes granting operational access to the trusted accessory when the modified seed sequence matches the stored access sequence. The process also includes denying operational access to the trusted accessory when the modified seed sequence does not match the stored access sequence.

Another embodiment takes the form of a system that includes a communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the trusted accessory is selected from the group consisting of (i) an audio-output accessory, (ii) a visual-output accessory, and (iii) a haptic-output accessory.

In at least one embodiment, detecting the accessory-access-request event comprises, detecting via a communication interface of the trusted accessory.

In at least one embodiment, detecting the accessory-access-request event comprises, detecting via a user interface of the trusted accessory.

In at least one embodiment, each seed-sequence element is part of an unordered set. In at least one such embodiment, at least one seed-sequence element is an element selected from the group consisting of (i) a number, (ii) an alphabetical character, (iii) a color in an unordered set of colors, (iv) an image in an unordered set of images, and (v) a sound in an unordered set of sounds.

In at least one embodiment, each seed-sequence element is part of an ordered set. In at least one such embodiment, at least one seed-sequence element is an element selected from the group consisting of (i) a number, (ii) an alphabetical character, (iii) a color in an ordered set of colors, (iv) an image in an ordered set of images, and (v) a sound in an ordered set of sounds.

In at least one embodiment, at least one of the seed-sequence-element-modifier signals comprises an increment-seed-sequence-element command. In at least one such embodiment, modifying the generated seed sequence in accordance with a received increment-seed-sequence-element command comprises incrementing a corresponding seed-sequence element.

In at least one embodiment, at least one of the seed-sequence-element-modifier signals comprises a decrement-seed-sequence-element command. In at least one such embodiment, modifying the generated seed sequence in accordance with a received decrement-seed-sequence-element command comprises decrementing a corresponding seed-sequence element.

In at least one embodiment, at least one of the seed-sequence-element-modifier signals comprises an output-different-element command. In at least one such embodiment, modifying the generated seed sequence in accordance with a received output-different-element command comprises outputting an indication of a random seed-sequence element.

In at least one embodiment, modifying the generated seed sequence comprises modifying the generated seed sequence on an element-by-element basis.

In at least one embodiment, outputting the indication of the at least one seed-sequence element via the user interface of the trusted accessory comprises outputting an audible indication of the at least one seed-sequence element.

In at least one embodiment, outputting the indication of the at least one seed-sequence element via the user interface of the trusted accessory comprises outputting a visual indication of the at least one seed-sequence element.

In at least one embodiment, outputting the indication of the at least one seed-sequence element via the user interface of the trusted accessory comprises outputting a haptic indication of the at least one seed-sequence element.

In at least one embodiment, outputting the indication of the at least one seed-sequence element via the user interface of the trusted accessory comprises outputting the indication of each and every seed-sequence element prior to receiving any seed-sequence-element-modifier signal.

In at least one embodiment, outputting the indication of the at least one seed-sequence element via the user interface of the trusted accessory comprises alternating between outputting a respective seed-sequence element and receiving a corresponding seed-sequence-element-modifier signal.

In at least one embodiment, the process further comprises outputting an indication of an updated value of a seed-sequence element as modified in response to a received seed-sequence-element-modifier signal.

In at least one embodiment, comparing the modified seed sequence with the stored access sequence comprises comparing the modified seed sequence with the stored access sequence in response to modifying the generated seed sequence.

In at least one embodiment, comparing the modified seed sequence with the stored access sequence comprises comparing the modified seed sequence with the stored access sequence in response to receiving a validate-modified-seed-sequence command.

In at least one embodiment, receiving the at least one seed-sequence-element-modifier signal comprises receiving via a communication interface of the trusted accessory.

In at least one embodiment, the at least one received seed-sequence-element-modifier signal is sent from a communication interface of an untrusted device. In at least one such embodiment, the at least one received seed-sequence-element-modifier signal is sent in response to an input to a user interface of the untrusted device. In at least one embodiment, the user interface of the untrusted device includes a touchscreen. In at least one embodiment, the user interface of the untrusted device includes at least one physical button.

At a high level, the systems and processes described herein use intelligent processing techniques in order to securely authenticate and permit an operational connection with a trusted accessory. In many embodiment the operational connection is between the trusted accessory and an untrusted device.

At least part of the motivation behind the systems and processes described herein is to establish that a device A is used by its genuine owner OA. This is because an owner OB of a device B is wants to ensure that he is actually talking with owner OA (i.e., the owner OB is not satisfied with knowing that he is communicating with device A, he wants to know that he is talking with owner OA). At least one issue mitigated by the systems and process disclosed herein is the threat of a device being stolen and being used by someone who's not its genuine owner so as to impersonate the original owner (e.g., OA).

At least part of the motivation behind the systems and processes described herein is the realization that it is desirable to utilize a high-security authentication protocol when requesting that a connection be established between various devices and accessories. In an illustrative example, an untrusted device attempts to connect to a trusted accessory. In order for the trusted accessory to authenticate the connection (and grant operational access to the trusted accessory to the untrusted device), a seed sequence of the trusted accessory must be modified, via signaling from the untrusted device, to match a stored access sequence of the trusted accessory.

The untrusted device is unaware (i.e., has zero knowledge) of contents (e.g., a particular sequence of specific seed-sequence elements) of the seed sequence nor contents of the stored access sequence, however a user of the trusted accessory is made cognizant, via various outputted sensory indications, of such. The user may then cause transmission of seed-sequence-element-modifier commands to the trusted accessory via operation of a user interface of the untrusted device. A seed-sequence-element-modifier command does not directly indicate a particular new seed-sequence element, as that paradigm would generate knowledge regarding the new seed-sequence, and potentially the stored access sequence, at the untrusted device.

Instead, a seed-sequence-element-modifier command may indicate an offset amount by which the seed-sequence element is to be adjusted. For example, if the seed sequence is initialized to be the number 5 and the stored access sequence is the number 8, a seed-sequence-element-modifier command may indicate an offset amount of 3. The untrusted device is still unable to determine that the initial seed sequence was 5 and the stored access sequence is 8. With such an implementation, the untrusted device is only able to determine a difference between the initial seed sequence and the stored access sequence.

Alternatively, a seed-sequence-element-modifier command may indicate a select-random-seed-sequence-element command which causes a given seed-sequence element to become a randomly selected seed-sequence element. For example, if the seed sequence is initialized to be the number 5 and the stored access sequence is the number 8, a seed-sequence-element-modifier command may indicate a random-seed-sequence-element command. The updated seed-sequence element may be selected (by the trusted accessory) to be 4 and an indication of such is outputted via a user interface of the trusted accessory. A user operating the trusted accessory is made aware of the state of the modified seed-sequence element via the outputted indication and realizes that the modified seed-sequence element still does not match the stored access sequence. The user may activate further random-seed-sequence-element commands and be made aware of the updated states of the modified seed-sequence element via outputted indications of such. Given sufficient iterations of the previous technique the updated seed-sequence element will eventually match the stored access sequence. The untrusted device is still unable to determine that the initial seed sequence was 5 and the stored access sequence is 8. With such an implementation, the untrusted device is only able to determine a number of seed-sequence-element modifications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
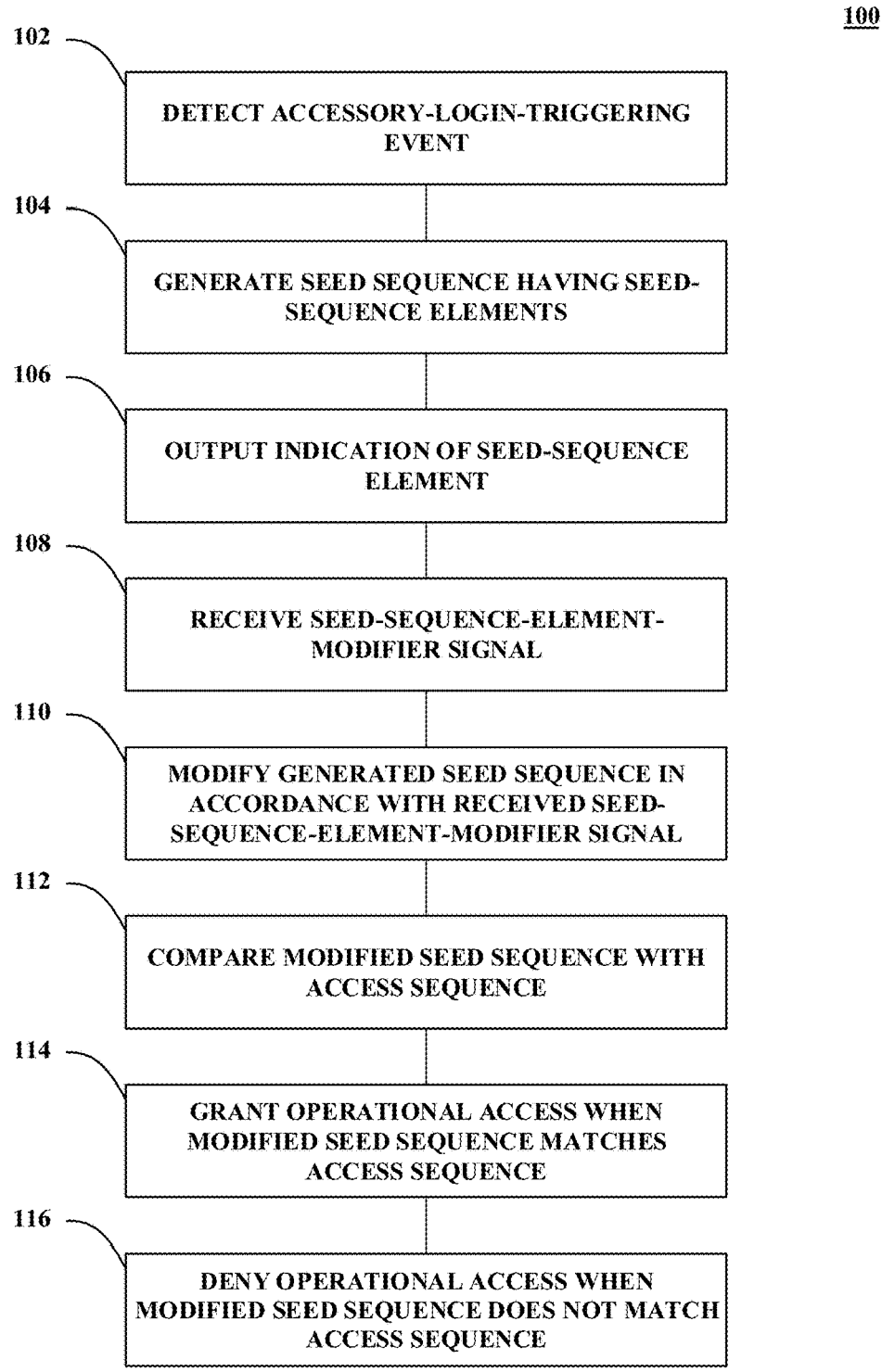
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1 depicts an example process, in accordance with at least one embodiment. In particular, FIG. 1 depicts an example process 100 that includes elements 102-116. Although primarily depicted and described as being performed serially, at least a portion of the elements (steps) of the process 100 may be performed contemporaneously, or in a different order than is depicted in and described in connection with FIG. 1. Furthermore, in at least one embodiment, the process 100 is repeated, at some point in time, after any of the elements 102-116 are completed. Additionally, repetition of the process 100 may or may not include performance of each element in the process 100, and may commence at any of the elements 102-116. The process 100 is further described below.

One embodiment takes the form of the process 100. The process 100 includes detecting an accessory-access-request event associated with a trusted accessory. The process 100 also includes generating a seed sequence having a first number of seed-sequence elements. The process 100 also includes outputting an indication of at least one seed-sequence element via a user interface of the trusted accessory. The process 100 also includes receiving, via a communication interface of the trusted accessory, at least one seed-sequence-element-modifier signal for at least one of the seed-sequence elements. The process 100 also includes modifying the generated seed sequence in accordance with the at least one received seed-sequence-element-modifier signal. The process 100 also includes comparing the modified seed sequence with a stored access sequence. The process 100 also includes granting operational access to the trusted accessory when the modified seed sequence matches the stored access sequence. The process 100 also includes denying operational access to the trusted accessory when the modified seed sequence does not match the stored access sequence.

The process 100, or a further embodiment of the process 100 is carried out by the trusted accessory.

The trusted accessory may take the form of an accessory that is capable of providing some form of sensory feedback to a user of the trusted accessory. The trusted accessory (and/or the untrusted device) may take the form of a computing and communication device 1500 as described with respect to FIG. 15. Common examples of trusted accessories include (i) an audio-output accessory, (ii) a visual-output accessory, and (iii) a haptic-output accessory. An audio-output accessory (e.g., a Bluetooth headset, a virtual-reality headset, and of course other audio-output accessories could be listed as well) is any accessory that includes an audio-output module (e.g., a speaker driver, an electrostatic transducer, a high-velocity-folded-ribbon transducer, and the like). A visual-output accessory (e.g., an augmented-reality headset, a virtual-reality headset, a personal monitor, a smart TV, and of course other visual-output accessories could be listed as well) is any accessory that includes a visual-output module (e.g., a television panel, a smart-glass-wearable display, a smart-watch-wearable display, a virtual-reality-headset display, an augmented-reality-headset display, and the like). A haptic-output accessory (e.g., a smartwatch, a vibration-enabled wearable device, a vibration-enabled headset, and of course other haptic-output accessories could be listed as well) is any accessory that includes a haptic-output module (e.g., an asymmetrically weighted disc attached to a motor—commonly found in smartphones, a pad array of pins, where the pins vibrate to simulate a surface being touched, and the like).

At element 102 the process 100 includes detecting an accessory-access-request event associated with a trusted accessory. An accessory-accesses-request event is an event that signals to the trusted accessory that a device is going to attempt to pair with it. In at least one embodiment, detecting the accessory-access-request event comprises, detecting via a communication interface of the trusted accessory. In at least one such embodiment, an access-request signal is sent from an untrusted device to the trusted accessory. A further illustration of this embodiment is provided in the description of FIG. 2. In at least one embodiment, detecting the accessory-access-request event comprises, detecting via a user interface of the trusted accessory. In at least one such embodiment, a prepare-for-pairing signal is triggered through the act of a user operating a user interface of the trusted accessory. A further illustration of this embodiment is provided in the description of FIG. 3.

At element 104 the process 100 includes generating a seed sequence having a first number of seed-sequence elements. The seed sequence may comprise one or more seed sequence elements. The seed sequence may be randomly or pseudo-randomly generated by the trusted accessory. It is important that an untrusted device does not have knowledge of what the state of the seed sequence is at any point in time.

A seed sequence element may be part of an ordered set of elements or an unordered set of elements. Examples of an ordered set of elements are an ordered set of numbers going from lowest to highest, an ordered set of letters going from "a"-"z", an ordered set of sounds going from lowest pitch to highest pitch, an ordered set of colors going from lowest frequency to highest frequency, an ordered set of images wherein the order is arbitrary yet defined, and other examples could of course be listed as well. Examples of an unordered set of elements are an unordered set of numbers, an unordered set of punctuation marks and operators, an unordered set of sounds, an unordered set of vibrational patterns, an unordered set of images, and other examples could of course be listed as well. Various combinations of the above listed examples may be implemented as well, for example an unordered set of sounds and images. In such a scenario, the seed sequence would be a sequence of sounds and images.

At element 106 the process 100 includes outputting an indication of at least one seed-sequence element via a user interface of the trusted accessory. In at least one embodiment outputting an indication of at least one seed-sequence element via a user interface of the trusted accessory comprises outputting an indication of each and every seed-sequence element via the user interface of the trusted accessory. The user interface of the trusted accessory may include an audio-output module, a visual-output module, a haptic-output module, and the like.

The exact form of the indication is dependent on the form of the seed-sequence elements. If a seed-sequence element is an image the indication is a visual indication outputted via a visual-output module. If the seed sequence element is a number the indication may a visual indication of the number (e.g., a visual-output module displaying the number 2), an audible indication of the number (e.g., an audio-output module outputting the sound "two" or "t"-"w"-"o"), a haptic indication of the number (e.g., a haptic-output module vibrating twice), and other means for indication could be listed as well. It would be obvious to one of skill in the relevant art how to output an indication of any possible seed-sequence element. Furthermore, it is clearly evident that different indication types may be deployed for a single given seed-sequence element as illustrated in the examples above.

In at least one embodiment, outputting the indication of at least one seed-sequence element via the user interface of the trusted accessory comprises outputting the indication of each and every seed-sequence element prior to receiving any seed-sequence-element-modifier signal. In such an embodiment, the user would be made aware of the entire seed sequence prior to sending any seed-sequence-element-modifier signal.

In at least one embodiment, outputting the indication of at least one seed-sequence element via the user interface of the trusted accessory comprises alternating between outputting an indication of a respective seed-sequence element and receiving a corresponding seed-sequence-element-modifier signal. In such an embodiment, the user would be made aware of a single seed-sequence element at a time and would transmit any corresponding seed-sequence-element-modifier signals for that seed-sequence element prior to receiving any indications of any other seed-sequence elements.

At element 108 the process 100 includes receiving at least one seed-sequence-element-modifier signal for at least one of the seed-sequence elements. In at least one embodiment, receiving the at least one seed-sequence-element-modifier signal comprises receiving via a communication interface of the trusted accessory. Receiving via the communication interface of the trusted accessory may comprise receiving via at least one of a Bluetooth connection, a WiFi connection, an Infrared connection, a NFC connection, an LTE connection, a 3G connection, a wired connection and the like. In at least one embodiment, the at least one received seed-sequence-element-modifier signal is sent from a communication interface of an untrusted device. In at least one such embodiment, the at least one received seed-sequence-element-modifier signal is sent in response to an input to a user interface of the untrusted device. In at least one embodiment, the user interface of the untrusted device comprises at least one of a capacitive touchscreen, a resistive touchscreen, a physical button, a pressure sensor, a physical toggle, a rotatable dial, and of course many other input means could be listed as well.

Seed-sequence-element-modifier signals may take a plurality of forms, each form causing a different response to take place at element 110 of the process 100.

The following four examples of seed-sequence-element-modifier signals are relevant when the seed-sequence elements are part of an ordered set. Because the seed-sequence elements are part of an ordered set it is valid to refer to incrementing to a "next" element in the set, decrementing to a "previous" element in the set, incrementing by a certain amount, decrementing by a certain amount, and other "directional" commands.

In at least one embodiment, at least one of the seed-sequence-element-modifier signals comprises an increment-seed-sequence-element command. An increment-seed-sequence-element command is a command to modify a seed-sequence element by changing it to a next seed-sequence element as defined by the ordered set.

In at least one embodiment, at least one of the seed-sequence-element-modifier signals comprises a decrement-seed-sequence-element command. A decrement-seed-sequence-element command is a command to modify a seed-sequence element by changing it to a previous seed-sequence element as defined by the ordered set.

In at least one embodiment, at least one of the seed-sequence-element-modifier signals comprises an increment-seed-sequence-element-by-offset command. An increment-seed-sequence-element-by-offset command is a command to modify a seed-sequence element by changing it to a seed-sequence element that is the indicated offset amount ahead of the current element as defined by the ordered set.

In at least one embodiment, at least one of the seed-sequence-element-modifier signals comprises a decrement-seed-sequence-element-by-offset command. A decrement-seed-sequence-element-by-offset command is a command to modify a seed-sequence element by changing it to a seed-sequence element that is the indicated offset amount behind the current element as defined by the ordered set.

The following example of a seed-sequence-element-modifier signal is relevant when the seed-sequence elements are part of an unordered set yet still applies when the seed-sequence elements are part of an ordered set. When the seed-sequence elements are part of an unordered set it is invalid to refer to incrementing to a "next" element in the set, decrementing to a "previous" element in the set, incrementing by a certain amount, decrementing by a certain amount, and other "directional" commands.

In at least one embodiment, at least one of the seed-sequence-element-modifier signals comprises an output-different-element command. An output-different-element command is a command to modify a seed-sequence element by changing it to randomly or pseudo-randomly determined seed-sequence element that is part of the set of elements. In this paradigm, a user must (in order to acquire operational access at the untrusted device) cause transmission of the output-different-element command until, by chance, the randomly or pseudo-randomly determined seed-sequence element matches a corresponding access-sequence element.

At element 110 the process 100 includes modifying the generated seed sequence in accordance with the at least one received seed-sequence-element-modifier signal.

In at least one embodiment, modifying the generated seed sequence comprises modifying the generated seed sequence on an element-by-element basis. In such an embodiment, a single element in the seed-sequence of elements is modified in accordance with received seed-sequence-element-modifier signals. A user may determine that they are done causing modifications of that seed-sequence element. The trusted accessory receives a terminate-modifying-element command and responsively terminates modification of that seed sequence element (and direct future seed-sequence-element-modifier signals towards a next element of the seed sequence). The process 100 may carry out such a step for each element in the seed sequence.

In at least one embodiment, modifying the generated seed sequence in accordance with a received increment-seed-sequence-element command comprises incrementing a corresponding seed-sequence element. In at least one embodiment, modifying the generated seed sequence in accordance with a received increment-seed-sequence-element-by-offset command comprises incrementing a corresponding seed-sequence element by the indicated offset.

In at least one embodiment, modifying the generated seed sequence in accordance with a received decrement-seed-sequence-element command comprises decrementing a corresponding seed-sequence element. In at least one embodiment, modifying the generated seed sequence in accordance with a received decrement-seed-sequence-element-by-offset command comprises decrementing a corresponding seed-sequence element by the indicated offset.

In at least one embodiment, modifying the generated seed sequence in accordance with a received output-different-element command comprises changing a corresponding seed-sequence element to be a random seed-sequence element.

In at least one embodiment, the process 100 further comprises outputting an indication of an updated value of a seed-sequence element as modified in response to a received seed-sequence-element-modifier signal.

The process 100 may include receiving an output-current-seed-sequence-element command. The command may be sent from the untrusted device or activated via a user interface of the trusted accessory. In response to receiving the output-current-seed-sequence-element command an indication of a current seed-sequence element as modified by any prior received seed-sequence-element-modifier signal is outputted via the user interface of the trusted accessory.

In at least one embodiment, receiving an output-current-seed-sequence-element command comprises receiving the output-current-seed-sequence-element command via a communication interface (not depicted) of the trusted accessory 202. Receiving, via the communication interface, the output-current-seed-sequence-element command may comprise receiving via at least one of a Bluetooth connection, a WiFi connection, an Infrared connection, a NFC connection, an LTE connection, a 3G connection, a wired connection and the like.

Additionally, the process 100 may include receiving an output-current-seed-sequence command. The command may be sent from the untrusted device or activated via a user interface of the trusted accessory. In response to receiving the output-current-seed-sequence command an indication of the entire seed sequence as modified by any prior received seed-sequence-element-modifier signal is outputted via the user interface of the trusted accessory.

In at least one embodiment, receiving an output-current-seed-sequence command comprises receiving the output-current-seed-sequence command via a communication interface (not depicted) of the trusted accessory 202. Receiving, via the communication interface, the output-current-seed-sequence command may comprise receiving via at least one of a Bluetooth connection, a WiFi connection, an Infrared connection, a NFC connection, an LTE connection, a 3G connection, a wired connection and the like.

At element 112 the process 100 includes comparing the modified seed sequence with a stored access sequence. In at least one embodiment, comparing the modified seed sequence with the stored access sequence comprises comparing the modified seed sequence with the stored access sequence in response to modifying the generated seed sequence. In at least one embodiment, comparing the modified seed sequence with the stored access sequence comprises comparing the modified seed sequence with the stored access sequence in response to receiving a validate-modified-seed-sequence command. The validate-modified-seed-sequence command may be sent from an untrusted device. The stored access sequence is a particular sequence of specific seed-sequence elements selected from a set of seed-sequence elements that matches the length of the seed sequence.

A user of the trusted accessory may have preexisting knowledge of the access sequence for the trusted device. In certain embodiments, a new access sequence is generated by the trusted accessory in response to detecting the accessory-access-request event. The generated access sequence should be random or pseudo-random, unknown to the untrusted device, and hard, if not impossible, to guess. Formally, in at least one embodiment, the process 100 further includes generating the stored access sequence.

At element 114 the process 100 includes granting operational access to the trusted accessory when the modified seed sequence matches the stored access sequence. Granting operation access means that the untrusted device may now transmit and receive signals from the trusted accessory for the purpose of performing standard tasks. In the case of the trusted accessory being a Bluetooth headset and the untrusted device being a smart phone, the smartphone is enabled to use the Bluetooth headset to send and receive calls. Other examples of standard tasks include outputting video of a movie to a headset and of course many other examples could be listed as well.

At element 116 the process 100 includes denying operational access to the trusted accessory when the modified seed sequence does not match the stored access sequence.

Figure 2:
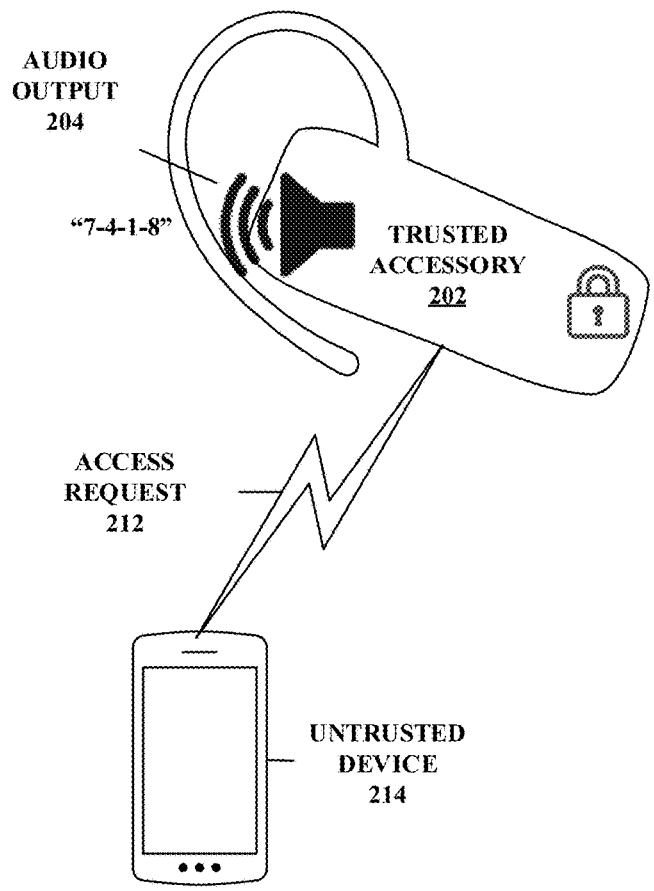
FIG. 2 depicts a first graphic overview of a trusted accessory detecting an accessory-access-request event, in accordance with an embodiment.

FIG. 2 depicts a first graphic overview of a trusted accessory detecting an accessory-access-request event. In particular, FIG. 2 depicts a graphic overview 200 which portrays a trusted accessory 202 that comprises an audio output 204. In accordance with at least one embodiment, the trusted accessory 202 is an audio-output accessory. The trusted accessory 202 is configured to carry out the process 100 or a further embodiment of the process 100. The graphic overview 200 further portrays an access sequence 206, a seed sequence 208, and an ordered set of seed-sequence elements 210.

Additionally, the graphic overview 200 portrays the trusted accessory 202 detecting an accessory-access-request event in the form of an access request 212. In at least one embodiment, detecting an accessory-access-request event comprises receiving an access request signal (e.g., a request to pair a Bluetooth headset with a smartphone) via a communication interface (not depicted) of the trusted accessory 202. Receiving, via the communication interface, the access request signal may comprise receiving via at least one of a Bluetooth connection, a WiFi connection, an Infrared connection, a NFC connection, an LTE connection, a 3G connection, a wired connection and the like.

In FIG. 2 an untrusted device 214 transmits the access request 212 to the trusted accessory 202. The untrusted device 214 is depicted as being a smartphone, however it may take the form of any device capable of transmitting at least one seed-sequence-element-modifier signal to the trusted accessory 202.

After detecting the accessory-access-request event in the form of receiving the access request 212, the trusted accessory 202 outputs an indication of at least one seed-sequence element via a user interface of the trusted accessory 202. More specifically, the trusted accessory 202 outputs an indication of the entire seed sequence 208 via the audio output 204 of the trusted accessory 202. The seed sequence is a sequence of numbers (i.e., the sequence "7-4-1-8"). At this point a user of the trusted accessory (who has knowledge of the access sequence 206 as well as the ordered set of seed-sequence elements 210) has been made aware of the current (i.e., original) state of the seed sequence 208. The user may next use a user interface of the untrusted device 214 to modify the seed sequence 208 so as to replicate (ie., mimic, match, etc.) the access sequence 206.

It is explicitly noted that although the access sequence 206, the seed sequence 208, and the ordered set of seed-sequence elements 210 are depicted as being outside of the trusted accessory 202, these elements in most embodiments are located in a data storage of the trusted accessory 202. Furthermore, in the balance of this disclosure, analogous elements are depicted as being located outside of a trusted accessory. This depiction is purely for the sake of visual simplicity and it is made clear that said analogous elements may be located in a data storage of the trusted accessory.

Figure 3:
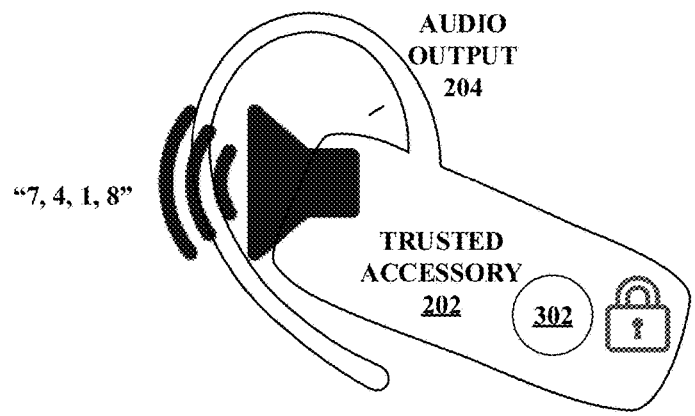
FIG. 3 depicts a second graphic overview of a trusted accessory detecting an accessory-access-request event, in accordance with an embodiment.

FIG. 3 depicts a second graphic overview of a trusted accessory detecting an accessory-access-request event. In particular, FIG. 3 depicts a graphic overview 300. The graphic overview 300 portrays the same trusted accessory 202, audio output 204, access sequence 206, seed sequence 208, and ordered set of seed-sequence elements 210 as the graphic overview 200 of FIG. 2. The graphic overview 300 further depicts an accessory-pairing-activation button 302. The accessory-pairing-activation button 302 is part of a user interface of the trusted accessory 202. In such an embodiment, detecting the accessory-access-request event comprises detecting that the accessory-pairing-activation button 302 is pressed.

After detecting the accessory-access-request event in the form of the depression of the accessory-pairing-activation button 302, the trusted accessory 202 outputs an indication of at least one seed-sequence element via a user interface of the trusted accessory 202. More specifically, the trusted accessory 202 outputs an indication of the entire seed sequence 208 via the audio output 204 of the trusted accessory 202. The seed sequence is a sequence of numbers (i.e., the sequence "7-4-1-8"). At this point a user of the trusted accessory (who has knowledge of the access sequence 206 as well as the ordered set of seed-sequence elements 210) has been made aware of the current (i.e., original) state of the seed sequence 208. The user may next use a user interface of an untrusted device to modify the seed sequence 208 so as to replicate (ie., mimic, match, etc.) the access sequence 206.

Figure 4:
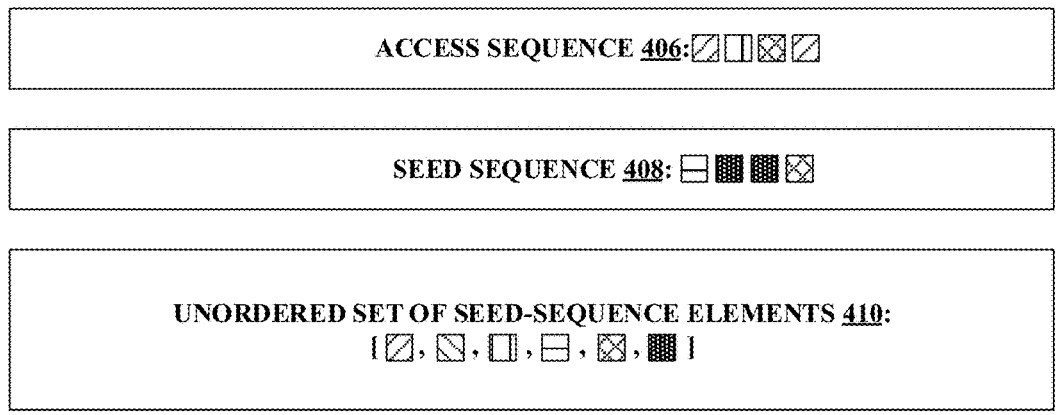
FIG. 4 depicts a first example identified region associated with the first example detected straight line of FIG. 3, in accordance with an embodiment.
Figure 4:
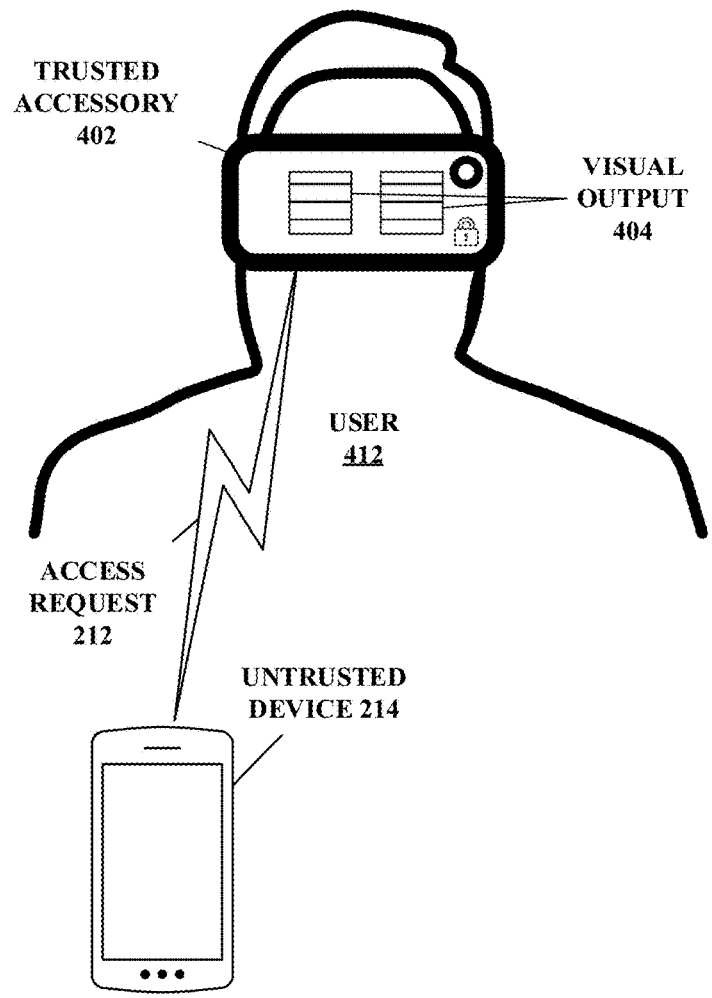

FIG. 4 depicts a third graphic overview of a trusted accessory detecting an accessory-access-request event. In particular, FIG. 4 depicts a graphic overview 400 which portrays a trusted accessory 402 that comprises a visual output 404. In accordance with at least one embodiment, the trusted accessory 402 is a visual-output accessory. The trusted accessory 402 is configured to carry out the process 100 or a further embodiment of the process 100. The graphic overview 400 further portrays an access sequence 406, a seed sequence 408, and an unordered set of seed-sequence elements 410. A user 412 is depicted wearing the trusted accessory 402. The user 412 can see the visual output 404 while wearing the trusted accessory 402. In the graphic overview 400 the content outputted by the visual output 404 is visible for the sake of clarity even though the trusted accessory 402 may not have a translucent housing.

Additionally, the graphic overview 400 portrays the trusted accessory 402 detecting an accessory-access-request event in the form of an access request 212. In at least one embodiment, detecting an accessory-access-request event comprises receiving an access request signal (e.g., a request to pair a virtual reality headset with a smartphone) via a communication interface (not depicted) of the trusted accessory 402. Receiving, via the communication interface, the access request signal may comprise receiving via at least one of a Bluetooth connection, a WiFi connection, an Infrared connection, a NFC connection, an LTE connection, a 3G connection, a wired connection and the like.

In FIG. 4 an untrusted device 214 transmits the access request 212 to the trusted accessory 402. The untrusted device 214 is depicted as being a smartphone, however it may take the form of any device (e.g., a smartwatch, a laptop, and the like) capable of transmitting at least one seed-sequence-element-modifier signal to the trusted accessory 402.

After detecting the accessory-access-request event in the form of receiving the access request 212, the trusted accessory 402 outputs an indication of at least one seed-sequence element via a user interface of the trusted accessory 402. More specifically, the trusted accessory 402 outputs an indication of a first seed sequence element of the seed sequence 208 via the visual output 404 of the trusted accessory 402. The seed sequence is a sequence of visual patterns comprising horizontal lines, small dots, small dots, and a crisscross pattern. At this point a user of the trusted accessory (who has knowledge of the access sequence 406 as well as the ordered set of seed-sequence elements 410) has been made aware of the current (i.e., original) state of the first element of the seed sequence 408. The user may next use a user interface of the untrusted device 214 to modify the first element of the seed sequence 408 so as to replicate (i.e., mimic, match, etc.) the first element of the access sequence 406.

A variety of techniques may be employed for alerting the trusted accessory 402 that modifications to the first element of the seed sequence 408 are complete and the process can progress to executing modifications to a next (e.g. the second) element of the seed sequence 408. These techniques would be well known by those with skill in the relevant art.

A first example of one method for alerting the trusted accessory 402 that modifications to a given element of the seed sequence 408 are complete would include receiving a "done-with-element" indication from the untrusted device 214. The indication can be sent in response to a user input to a user interface of the untrusted device 214 and instructs the trusted accessory 402 that modifications to that given seed sequence element are complete. Responsively, the trusted accessory 402 will move on to modifying other seed sequence elements (i.e., elements in different positions of the seed sequence) and not return to modifying that given seed sequence element. A second example would include receiving "next-element-position" and/or "previous-element-position" commands from the untrusted device 214. A third example would comprise the seed-sequence-element-modifier signals including an indication of which seed sequence position the modification command is to be applied to. Further descriptions of the above functionality is provided with respect to FIGS. 11-14.

Figure 5:
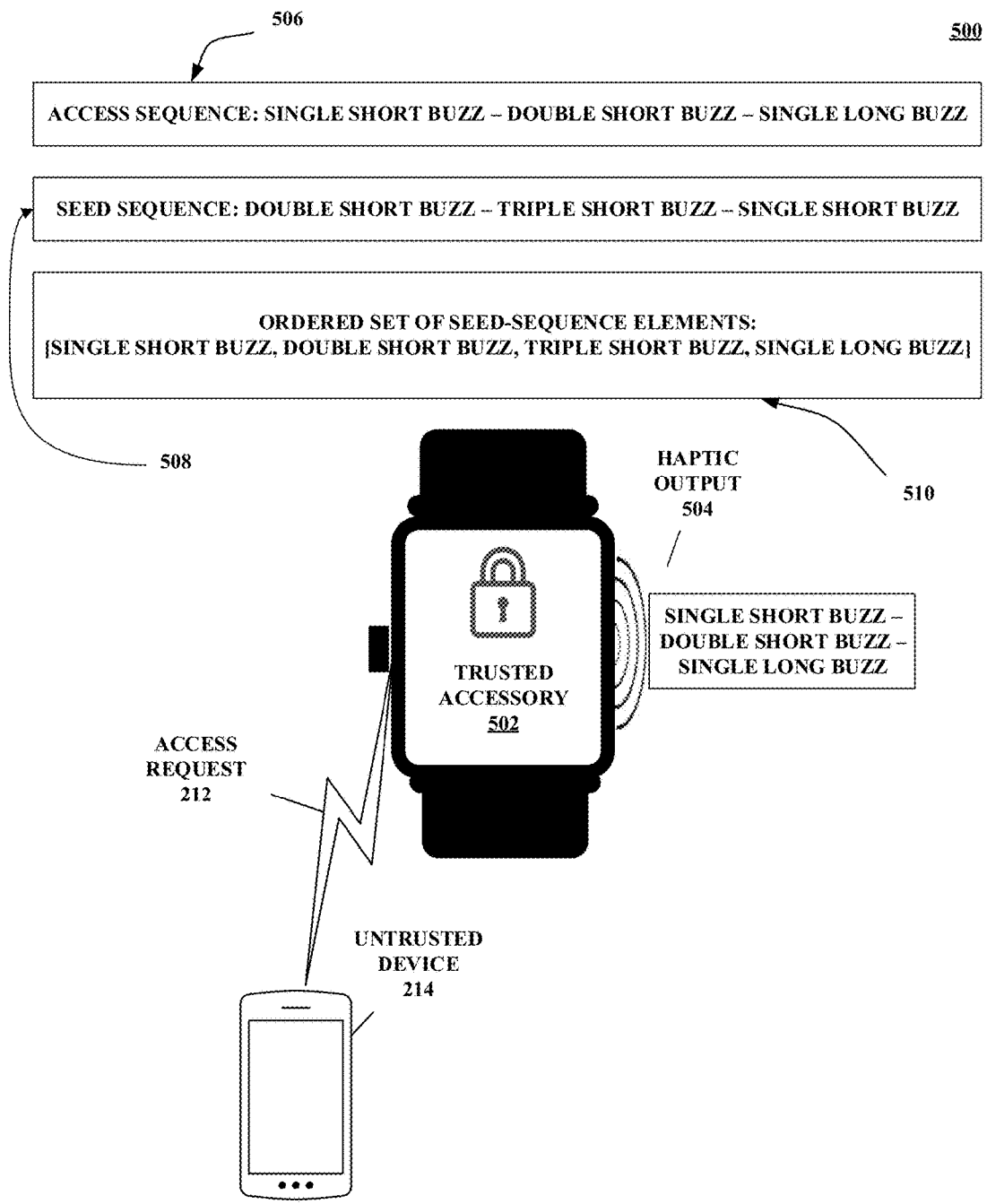
FIG. 5 depicts a second example identified region associated with the first example detected straight line of FIG. 3, in accordance with an embodiment.

FIG. 5 depicts a fourth graphic overview of a trusted accessory detecting an accessory-access-request event. In particular, FIG. 5 depicts a graphic overview 500 which portrays a trusted accessory 502 that comprises a haptic output 504. In accordance with at least one embodiment, the trusted accessory 502 is a haptic-output accessory. The trusted accessory 502 is configured to carry out the process 100 or a further embodiment of the process 100. The graphic overview 500 further portrays an access sequence 506, a seed sequence 508, and an ordered set of seed-sequence elements 510.

Additionally, the graphic overview 500 portrays the trusted accessory 502 detecting an accessory-access-request event in the form of an access request 212. In at least one embodiment, detecting an accessory-access-request event comprises receiving an access request signal (e.g., a request to pair a smartwatch with a smartphone) via a communication interface (not depicted) of the trusted accessory 502. Receiving, via the communication interface, the access request signal may comprise receiving via at least one of a Bluetooth connection, a WiFi connection, an Infrared connection, a NFC connection, an LTE connection, a 3G connection, a wired connection and the like.

In FIG. 5 an untrusted device 214 transmits the access request 212 to the trusted accessory 502. The untrusted device 214 is depicted as being a smartphone, however it may take the form of any device (e.g., a smartwatch, a laptop, and the like) capable of transmitting at least one seed-sequence-element-modifier signal to the trusted accessory 502.

After detecting the accessory-access-request event in the form of receiving the access request 212, the trusted accessory 502 outputs an indication of at least one seed-sequence element via a user interface of the trusted accessory 502. More specifically, the trusted accessory 502 outputs an indication of a first seed sequence element of the seed sequence 208 via the haptic output 504 of the trusted accessory 502. The seed sequence is a sequence of vibrational patterns comprising a double short buzz, a triple short buzz, and a single short buzz. At this point a user of the trusted accessory (who has knowledge of the access sequence 506 as well as the ordered set of seed-sequence elements 510) has been made aware of the current (i.e., original) state of the seed sequence 508. The user may next use a user interface of the untrusted device 214 to modify the elements of the seed sequence 508 so as to replicate (ie., mimic, match, etc.) the elements of the access sequence 506.

FIGS. 6-9 together illustrate an example sequence of receiving seed-sequence-element-modifier signals and modifying the seed sequence in accordance with the received seed-sequence-element-modifier signals. FIGS. 6-9 illustrate an example with respect to the trusted accessory 202 of FIG. 2, however it would be obvious to those with skill in the art how an analogous example would be carried out with respect to the trusted accessory 402 of FIG. 4 or the trusted accessory 502 of FIG. 5.

Figure 6:
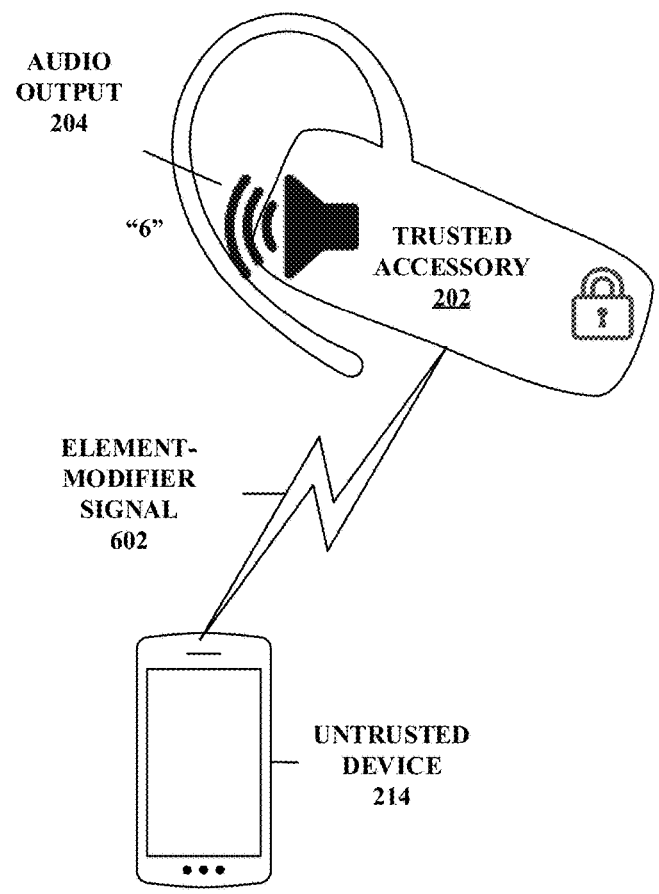
FIG. 6 depicts the trusted accessory of FIG. 2 receiving a seed-sequence-element-modifier signal and modifying the seed sequence, in accordance with an embodiment.

FIG. 6 depicts the trusted accessory of FIG. 2 receiving a seed-sequence-element-modifier signal and modifying the seed sequence accordingly. In particular FIG. 6 depicts the trusted accessory 202 receiving a seed-sequence-element-modifier signal in the form of an element-modifier signal 602. The element-modifier signal 602 is sent from the untrusted device 214.

The element-modifier signal 602 conveys a decrement-seed-sequence-element command associated with a first seed-sequence-element position. The trusted accessory 202 modifies the seed-sequence element in the first seed-sequence-element position accordingly. The modified seed sequence 604 is updated to be "6-4-1-8". In FIG. 6, the trusted accessory 202 outputs an indication of the first seed-sequence element as modified, in response to receiving the element-modifier signal 602.

Figure 7:
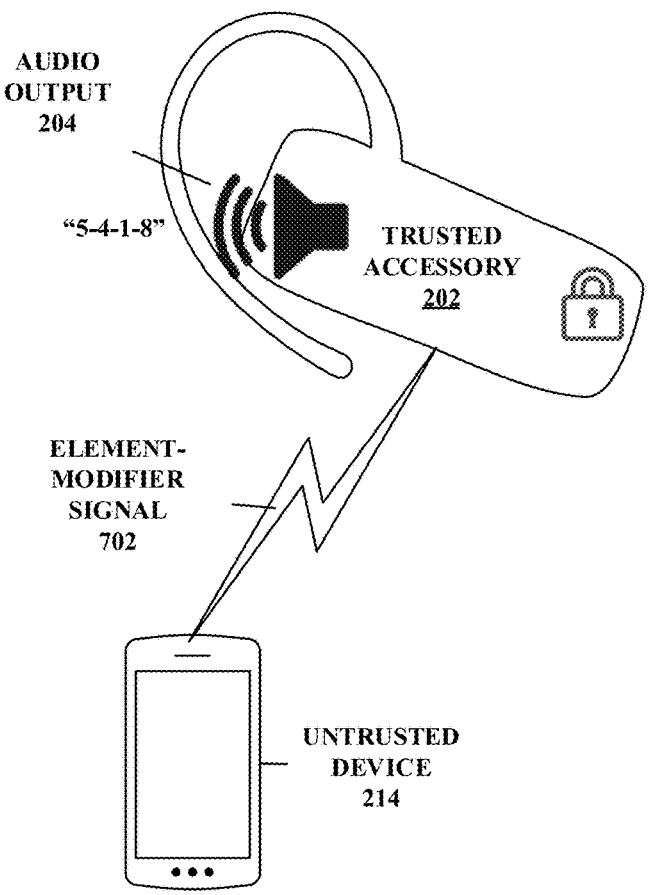
FIG. 7 depicts the trusted accessory of FIG. 6 receiving a seed-sequence-element-modifier signal and modifying the seed sequence, in accordance with an embodiment.

FIG. 7 depicts the trusted accessory of FIG. 6 receiving a seed-sequence-element-modifier signal and modifying the seed sequence accordingly. In particular FIG. 7 depicts the trusted accessory 202 receiving a seed-sequence-element-modifier signal in the form of an element-modifier signal 702. The element-modifier signal 702 is sent from the untrusted device 214.

The element-modifier signal 702 conveys a decrement-seed-sequence-element command associated with the first seed-sequence-element position. The trusted accessory 202 modifies the seed-sequence element in the first seed-sequence-element position accordingly. The modified seed sequence 704 is updated to be "5-4-1-8". In FIG. 7, the trusted accessory 202 outputs an indication of the entire seed-sequence as modified, in response to receiving the element-modifier signal 602.

Figure 8:
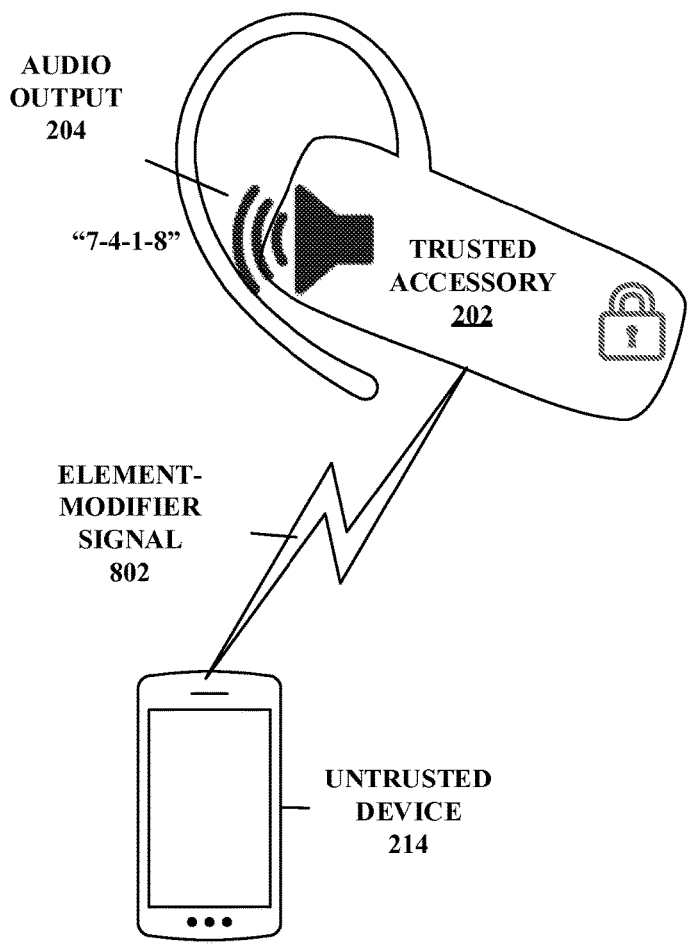
FIG. 8 depicts the trusted accessory of FIG. 7 receiving a seed-sequence-element-modifier signal and modifying the seed sequence, in accordance with an embodiment.

FIG. 8 depicts the trusted accessory of FIG. 7 receiving a seed-sequence-element-modifier signal and modifying the seed sequence accordingly. In particular FIG. 8 depicts the trusted accessory 202 receiving a seed-sequence-element-modifier signal in the form of an element-modifier signal 802. The element-modifier signal 802 is sent from the untrusted device 214.

The element-modifier signal 802 conveys an increment-seed-sequence-element command associated with a third seed-sequence-element position. The trusted accessory 202 modifies the seed-sequence element in the third seed-sequence-element position accordingly. The modified seed sequence 804 is updated to be "5-4-2-8". In FIG. 8, the trusted accessory 202 outputs an indication of the modified seed sequence 804, in response to receiving the element-modifier signal 602.

Figure 9:
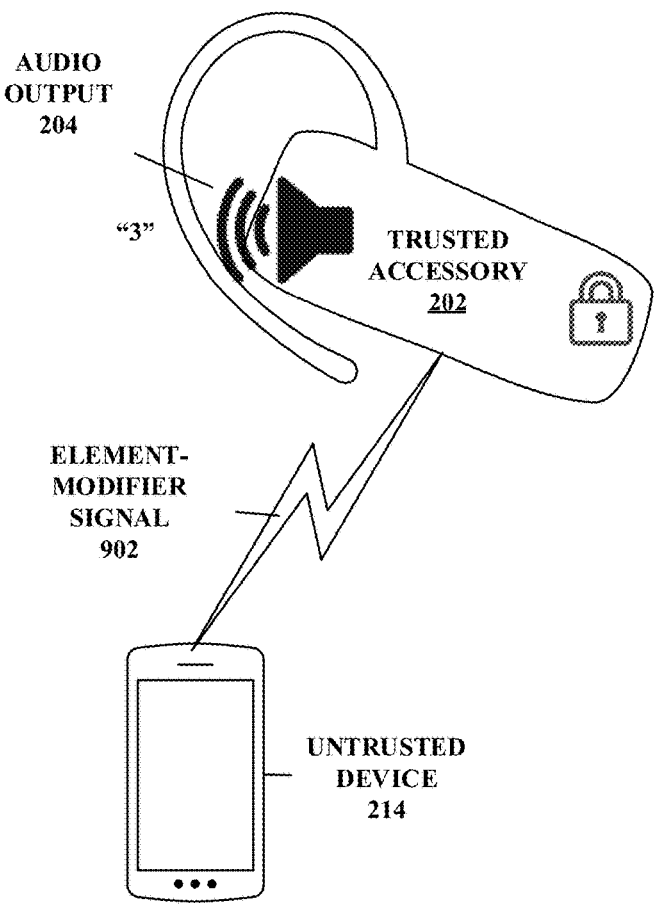
FIG. 9 depicts the trusted accessory of FIG. 8 receiving a seed-sequence-element-modifier signal and modifying the seed sequence, in accordance with an embodiment.

FIG. 9 depicts the trusted accessory of FIG. 8 receiving a seed-sequence-element-modifier signal and modifying the seed sequence accordingly. In particular FIG. 9 depicts the trusted accessory 202 receiving a seed-sequence-element-modifier signal in the form of an element-modifier signal 902. The element-modifier signal 902 is sent from the untrusted device 214.

The element-modifier signal 902 conveys an increment-seed-sequence-element-by-offset command associated with a fourth seed-sequence-element position. The indicated offset is 5 (incrementing from 9 results in wrapping around to 0). The trusted accessory 202 modifies the seed-sequence element in the fourth seed-sequence-element position accordingly. The modified seed sequence 904 is updated to be "5-4-2-3". In FIG. 9, the trusted accessory 202 outputs an indication of the fourth seed-sequence element as modified, in response to receiving the element-modifier signal 902.

Figure 10:
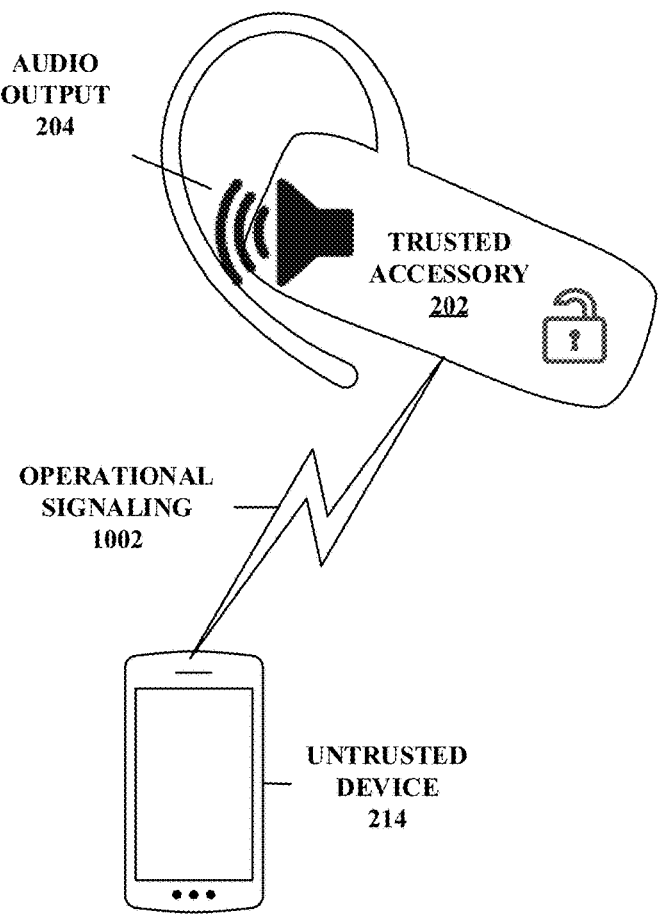
FIG. 10 depicts the trusted accessory of FIG. 9 comparing the modified seed sequence with a stored access sequence and responsively granting operational access to the trusted accessory, in accordance with an embodiment.

FIG. 10 depicts the trusted accessory of FIG. 9 comparing the modified seed sequence with a stored access sequence and responsively granting operational access to the trusted accessory. In FIG. 10 the modified seed sequence 904 is compared with the access sequence 206. In FIG. 10 the modified seed sequence 904 matches the access sequence 206. Operation access to the trusted accessory 202 is granted for the untrusted device 214. As a result, operational signaling 1002 may commence. The operational signaling 1002 may take the form of any standard or encrypted signaling between a device and an accessory that takes place after pairing is completed.

Figure 11:
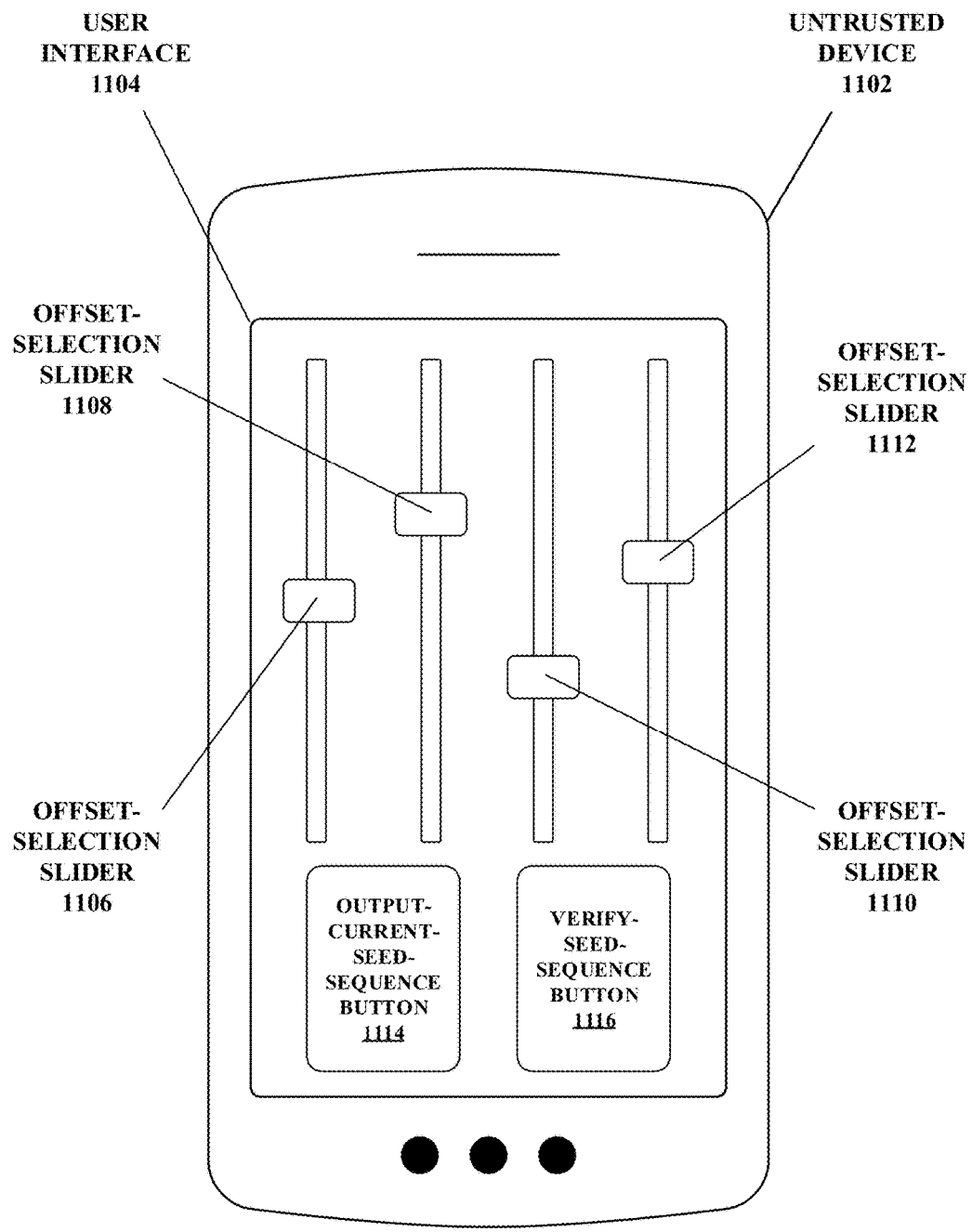
FIG. 11 depicts a first example user interface of an untrusted device, in accordance with an embodiment.

FIG. 11 depicts a first example user interface of an untrusted device. In particular, FIG. 11 depicts an untrusted device 1102. The untrusted device 1102 may take the form of a computing and communication device as described below with respect to FIG. 15. The untrusted device 1102 includes a user interface 1104. In at least one embodiment of the untrusted device 1102, the user interface 1104 includes a touchscreen.

In at least one embodiment, the user interface 1104 is programmed to responsively transmit to a trusted accessory, via a communication interface, communication signals upon detecting user input. The trusted accessory may take the form of a computing and communication device 1500 as described with respect to FIG. 15, the trusted accessory 202 of FIG. 2, and/or any of the various embodiments of trusted accessories disclosed herein. A given communication signal may take the form of an accessory-login request, a seed-sequence-element modifier signal, a seed-sequence-position-modifier signal, an output-indication-of-current-seed-sequence-element signal, an output-current-indication-of-seed-sequence signal, an output-indication-of-current-access-sequence-element signal, an output-indication-of-current-access-sequence signal, a verify-seed-sequence-element signal, a verify-seed-sequence signal, a standard operational signal (i.e., operation signaling), and of course many other forms of communication signals could be listed as well.

The user interface 1104 includes a first offset-selection slider 1106, a second offset-selection slider 1108, a third offset-selection slider 1110, a fourth offset-selection slider 1112, an output-current-seed-sequence button 1114, and a verify-seed-sequence button 1116. Each of the various offset-selection sliders 1106-1112 are configured activate transmissions of various seed-sequence-element modifier signals.

The offset-selection slider 1106 is configured to activate transmission of a seed-sequence-element modifier signal associated with a first seed-sequence position. The offset-selection slider 1108 is configured to activate transmission of a seed-sequence-element modifier signal associated with a second seed-sequence position. The offset-selection slider 1110 is configured to activate transmission of a seed-sequence-element modifier signal associated with a third seed-sequence position. The offset-selection slider 1112 is configured to activate transmission of a seed-sequence-element modifier signal associated with a fourth seed-sequence position. Each offset-selection slider 1106-1112 is configured to activate transmission of a seed-sequence-element modifier signal in the form of a modify-seed-sequence-element-by-offset command. The value of the corresponding offsets indicated via the various commands are based on the respective positions of the respective offset-selection sliders 1106-1112.

The output-current-seed-sequence button 1114 is configured to activate transmission of an output-current-indication-of-seed-sequence signal to a trusted accessory. Responsive to detection of the transmitted output-current-indication-of-seed-sequence signal, the trusted accessory outputs an indication of the current seed sequence via a user interface of the trusted accessory.

The verify-seed-sequence button 1116 is configured to activate transmission of a verify-seed-sequence signal to a trusted accessory. Responsive to detection of the transmitted verify-seed-sequence signal, the trusted accessory compares the current seed sequence with a stored access sequence. If the current seed sequence matches the stored access sequence the trusted accessory grants operational access to the untrusted device 1102. If the current seed sequence does not the stored access sequence the trusted accessory denies operational access to the untrusted device 1102.

In an alternative embodiment, each offset-selection slider 1106-1112 is configured to modify and store respective seed-sequence-element offset values, based on the respective positions of the respective offset-selection sliders 1106-1112, in a data storage of the untrusted device 1102. The values of the corresponding offsets indicated via respective positions of the respective offset-selection sliders 1106-1112 are compiled into a single modify-seed-sequence signal before or upon activation of the verify-seed-sequence button 1116.

The verify-seed-sequence button 1116 is configured to activate transmission of the single modify-seed-sequence signal as well as a verify-seed-sequence signal to a trusted accessory. Responsive to detection of the transmitted modify-seed-sequence signal, the trusted accessory modifies the seed sequence accordingly. Next, responsive to detection of the transmitted verify-seed-sequence signal, the trusted accessory compares the modified seed sequence with a stored access sequence. If the modified seed sequence matches the stored access sequence the trusted accessory grants operational access to the untrusted device 1102. If the modified seed sequence does not the stored access sequence the trusted accessory denies operational access to the untrusted device 1102.

Figure 12:
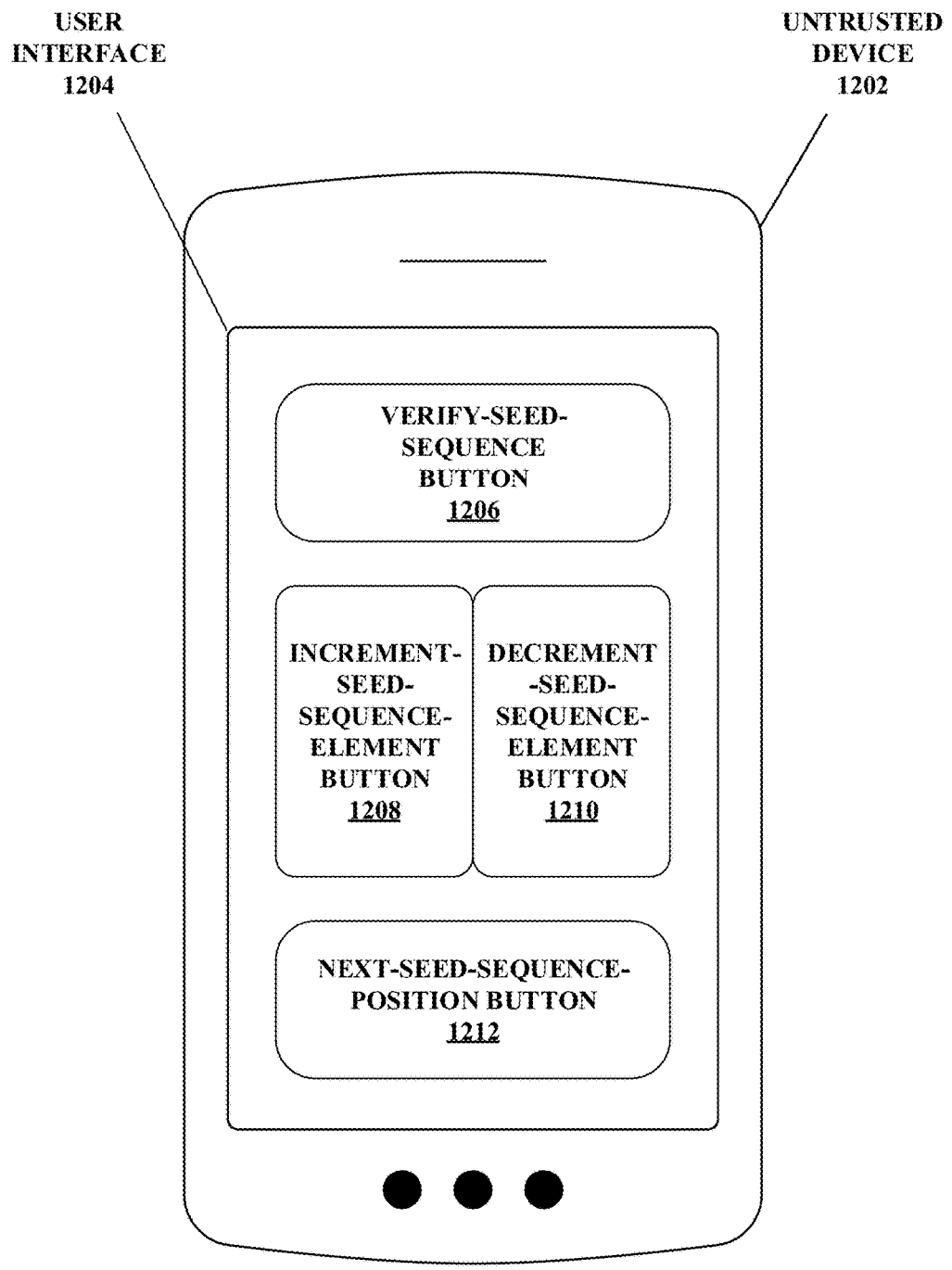
FIG. 12 depicts a second example user interface of an untrusted device, in accordance with an embodiment.

FIG. 12 depicts a second example user interface of an untrusted device. In particular, FIG. 12 depicts an untrusted device 1202. The untrusted device 1202 may take the form of a computing and communication device as described below with respect to FIG. 15. The untrusted device 1202 includes a user interface 1204. In at least one embodiment of the untrusted device 1202, the user interface 1204 includes a touchscreen.

In at least one embodiment, the user interface 1204 is programmed to responsively transmit to a trusted accessory, via a communication interface, communication signals upon detecting user input. The trusted accessory may take the form of a computing and communication device 1500 as described with respect to FIG. 15, the trusted accessory 202 of FIG. 2, and/or any of the various embodiments of trusted accessories disclosed herein. A given communication signal may take the form of an accessory-login request, a seed-sequence-element modifier signal, a seed-sequence-position-modifier signal, an output-indication-of-current-seed-sequence-element signal, an output-current-indication-of-seed-sequence signal, an output-indication-of-current-access-sequence-element signal, an output-indication-of-current-access-sequence signal, a verify-seed-sequence-element signal, a verify-seed-sequence signal, a standard operational signal (i.e., operation signaling), and of course many other forms of communication signals could be listed as well.

The user interface 1204 includes a verify-seed-sequence button 1206, an increment-seed-sequence-element button 1208, a decrement-seed-sequence-element button 1210, and a next-seed-sequence-position button 1212.

The verify-seed-sequence button 1206 is configured to activate transmission of a verify-seed-sequence signal to a trusted accessory. Responsive to detection of the transmitted verify-seed-sequence signal, the trusted accessory compares the current seed sequence with a stored access sequence. If the current seed sequence matches the stored access sequence the trusted accessory grants operational access to the untrusted device 1202. If the current seed sequence does not the stored access sequence the trusted accessory denies operational access to the untrusted device 1202.

The increment-seed-sequence-element button 1208 is configured to activate transmission of an increment-seed-sequence-element signal to a trusted accessory. Responsive to detection of the transmitted increment-seed-sequence-element signal, the trusted accessory modifies a corresponding seed-sequence element to be a next seed-sequence element as defined by an ordered set of seed-sequence elements. In at least one embodiment, the next-seed-sequence-position button 1212 is disabled until after utilization of at least one of the increment-seed-sequence-element button 1208 and the decrement-seed-sequence-element button 1210. In such an embodiment, before activating the next-seed-sequence-position button 1212, the increment-seed-sequence-element button 1208 and the decrement-seed-sequence-element button 1210 will modify a seed-sequence element in a first position of the seed sequence.

The decrement-seed-sequence-element button 1210 is configured to activate transmission of a decrement-seed-sequence-element signal to a trusted accessory. Responsive to detection of the transmitted decrement-seed-sequence-element signal, the trusted accessory modifies a corresponding seed-sequence element to be a previous seed-sequence element as defined by the ordered set of seed-sequence elements.

The next-seed-sequence-position button 1212 is configured to activate transmission of a seed-sequence-position-modifier signal to a trusted accessory. In particular, the seed-sequence-position-modifier signal takes the form of an increment-seed-sequence-position signal. Responsive to detection of the transmitted seed-sequence-position-modifier signal, the trusted accessory selects a seed-sequence element in the next position of the seed sequence to be the seed-sequence element that is modified by future increment-seed-sequence-element signals and decrement-seed-sequence-element signals.

Figure 13:
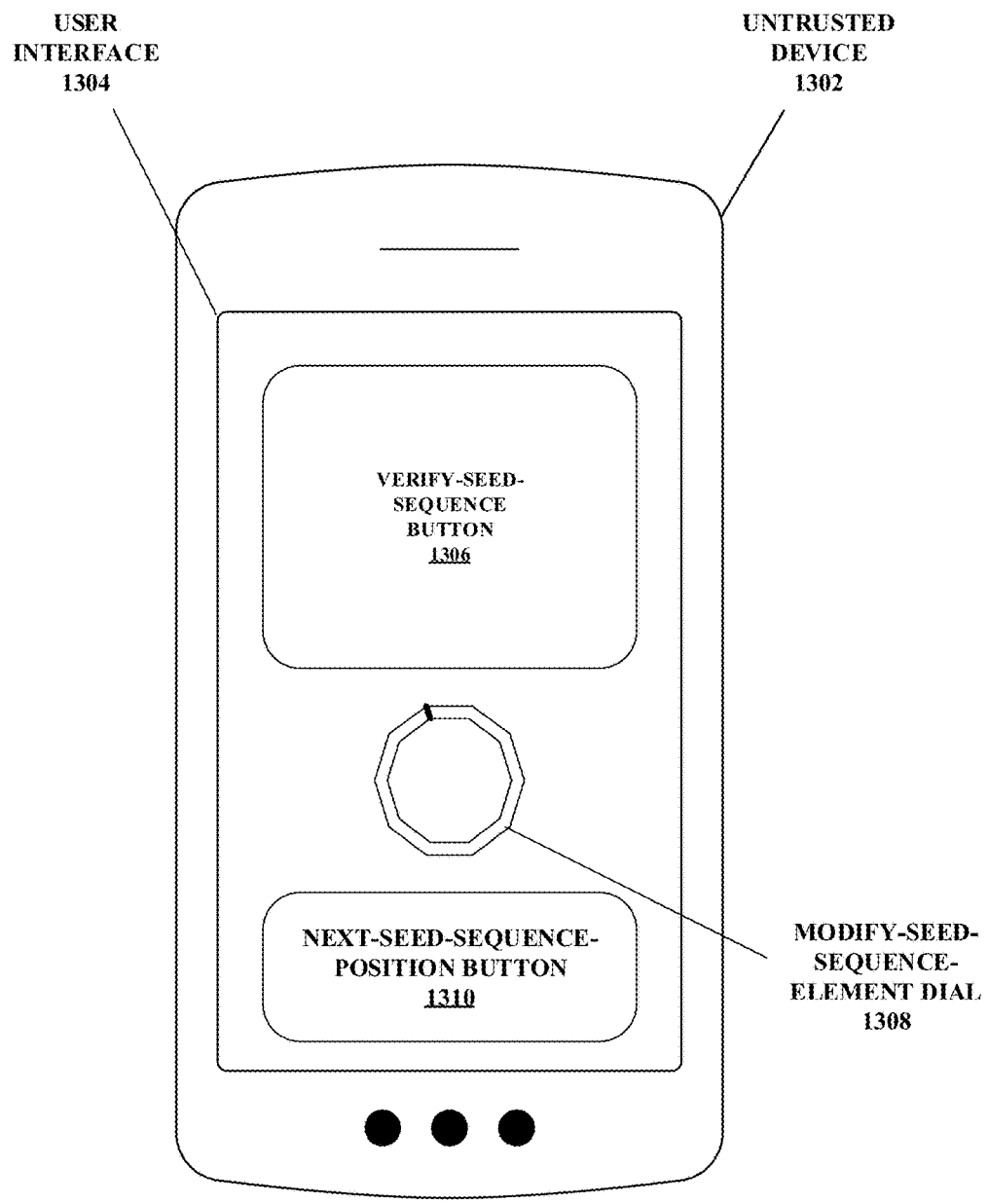
FIG. 13 depicts a third example user interface of an untrusted device, in accordance with an embodiment.

FIG. 13 depicts a third example user interface of an untrusted device. In particular, FIG. 13 depicts an untrusted device 1302. The untrusted device 1302 may take the form of a computing and communication device as described below with respect to FIG. 15. The untrusted device 1302 includes a user interface 1304. In at least one embodiment of the untrusted device 1302, the user interface 1304 includes a touchscreen.

In at least one embodiment, the user interface 1304 is programmed to responsively transmit to a trusted accessory, via a communication interface, communication signals upon detecting user input. The trusted accessory may take the form of a computing and communication device 1500 as described with respect to FIG. 15, the trusted accessory 202 of FIG. 2, and/or any of the various embodiments of trusted accessories disclosed herein. A given communication signal may take the form of an accessory-login request, a seed-sequence-element modifier signal, a seed-sequence-position-modifier signal, an output-indication-of-current-seed-sequence-element signal, an output-current-indication-of-seed-sequence signal, an output-indication-of-current-access-sequence-element signal, an output-indication-of-current-access-sequence signal, a verify-seed-sequence-element signal, a verify-seed-sequence signal, a standard operational signal (i.e., operation signaling), and of course many other forms of communication signals could be listed as well.

The user interface 1304 includes a verify-seed-sequence button 1306, a modify-seed-sequence-element dial 1308, and a next-seed-sequence-position button 1312.

The verify-seed-sequence button 1306 is configured to activate transmission of a verify-seed-sequence signal to a trusted accessory. Responsive to detection of the transmitted verify-seed-sequence signal, the trusted accessory compares the current seed sequence with a stored access sequence. If the current seed sequence matches the stored access sequence the trusted accessory grants operational access to the untrusted device 1302. If the current seed sequence does not the stored access sequence the trusted accessory denies operational access to the untrusted device 1302.

The modify-seed-sequence-element dial 1308 is configured to activate transmission of a modify-seed-sequence-element signal (e.g., either an increment-seed-sequence-element-by-offset signal to a trusted accessory or a decrement-seed-sequence-element-by-offset signal to the trusted accessory based on a position of the modify-seed-sequence-element dial 1308). The value of the offset indicated via the transmitted modify-seed-sequence-element signal is based on the position of the modify-seed-sequence-element dial 1308. When the position of the modify-seed-sequence-element dial 1308 is adjusted via utilization of the user interface 1304 a new modify-seed-sequence-element signal is transmitted to the trusted accessory. The new modify-seed-sequence-element signal indicates the value of the new corresponding offset.

Responsive to detection of any transmitted modify-seed-sequence-element signal, the trusted accessory modifies a corresponding seed-sequence element to reflect changes indicated by the offset. In at least one embodiment, the next-seed-sequence-position button 1310 is disabled until after utilization of the modify-seed-sequence-element dial 1308. In such an embodiment, before activating the next-seed-sequence-position button 1310, the modify-seed-sequence-element dial 1308 will modify a seed-sequence element in a first position of the seed sequence.

The next-seed-sequence-position button 1310 is configured to activate transmission of a seed-sequence-position-modifier signal to a trusted accessory. In particular, the seed-sequence-position-modifier signal takes the form of an increment-seed-sequence-position signal. Responsive to detection of the transmitted seed-sequence-position-modifier signal, the trusted accessory selects a seed-sequence element in the next position of the seed sequence to be the seed-sequence element that is modified by future increment-seed-sequence-element signals and decrement-seed-sequence-element signals.

Figure 14:
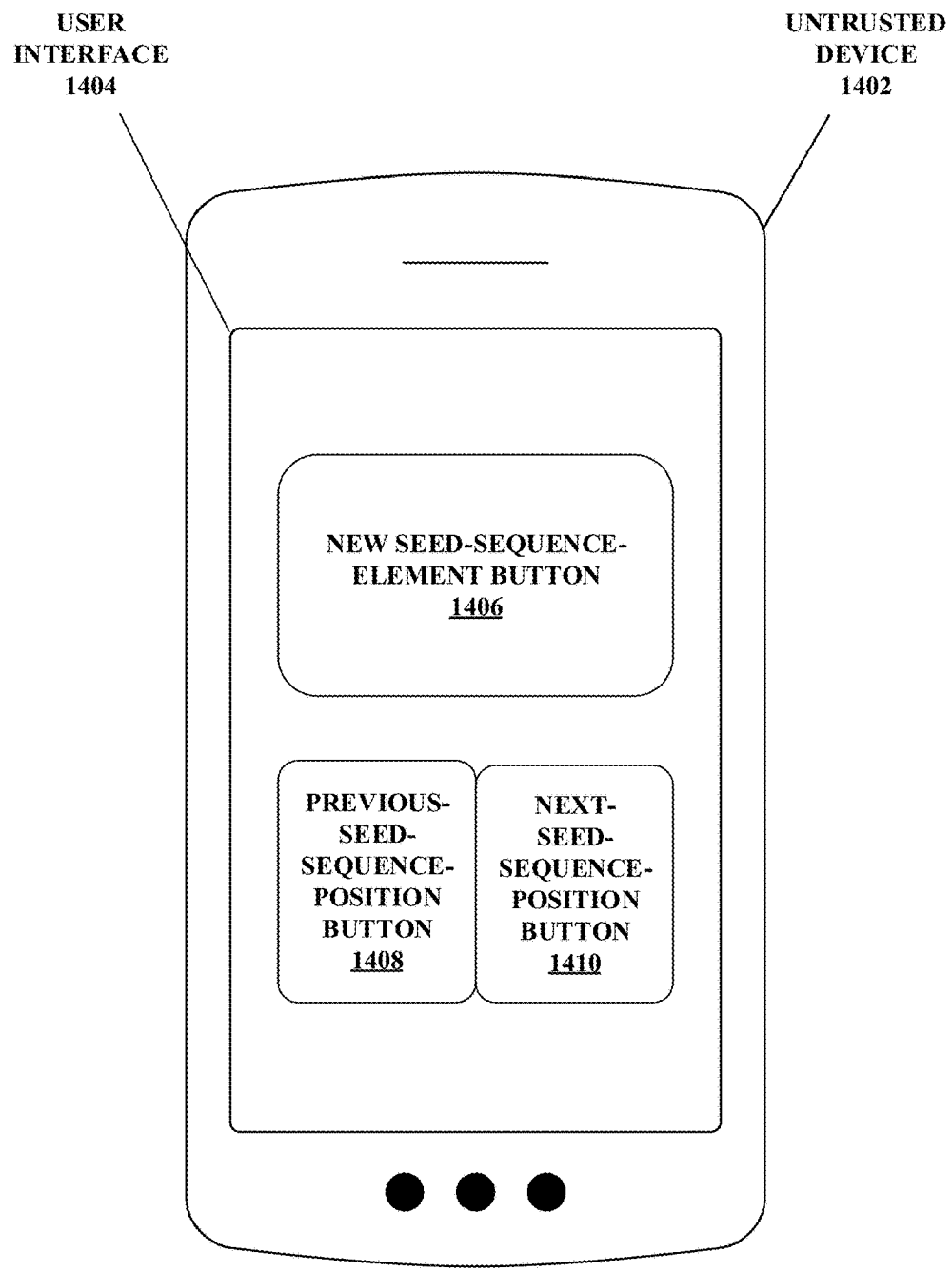
FIG. 14 depicts a fourth example user interface of an untrusted device, in accordance with an embodiment.

FIG. 14 depicts a fourth example user interface of an untrusted device. In particular, FIG. 14 depicts an untrusted device 1402. The untrusted device 1402 may take the form of a computing and communication device as described below with respect to FIG. 15. The untrusted device 1402 includes a user interface 1404. In at least one embodiment of the untrusted device 1402, the user interface 1404 includes a plurality of physical buttons.

In at least one embodiment, the user interface 1404 is programmed to responsively transmit to a trusted accessory, via a communication interface, communication signals upon detecting user input. The trusted accessory may take the form of a computing and communication device 1500 as described with respect to FIG. 15, the trusted accessory 202 of FIG. 2, and/or any of the various embodiments of trusted accessories disclosed herein. A given communication signal may take the form of an accessory-login request, a seed-sequence-element modifier signal, a seed-sequence-position-modifier signal, an output-indication-of-current-seed-sequence-element signal, an output-current-indication-of-seed-sequence signal, an output-indication-of-current-access-sequence-element signal, an output-indication-of-current-access-sequence signal, a verify-seed-sequence-element signal, a verify-seed-sequence signal, a standard operational signal (i.e., operation signaling), and of course many other forms of communication signals could be listed as well.

The user interface 1404 includes a new-seed-sequence-element button 1406, a previous-seed-sequence-position button 1408, and a next-seed-sequence-position button 1410.

The new-seed-sequence-element button 1406 is configured to activate transmission of a seed-sequence-element modifier signal to a trusted accessory. In particular, the seed-sequence-element modifier signal takes the form of a select-random-seed-sequence-element signal. Responsive to detection of the transmitted seed-sequence-element modifier signal, the trusted accessory modifies the current seed-sequence element to be a random or pseudo-random seed-sequence element selected from a set of seed-sequence elements.

The previous-seed-sequence-position button 1408 is configured to activate transmission of a seed-sequence-position-modifier signal to a trusted accessory. In particular, the seed-sequence-position-modifier signal takes the form of a decrement-seed-sequence-position signal. Responsive to detection of the transmitted seed-sequence-position-modifier signal, the trusted accessory selects a seed-sequence element in the previous position of the seed sequence to be the seed-sequence element that is modified by future seed-sequence-element modifier signals.

The next-seed-sequence-position button 1410 is configured to activate transmission of a seed-sequence-position-modifier signal to a trusted accessory. In particular, the seed-sequence-position-modifier signal takes the form of an increment-seed-sequence-position signal. Responsive to detection of the transmitted seed-sequence-position-modifier signal, the trusted accessory selects a seed-sequence element in the next position of the seed sequence to be the seed-sequence element that is modified by future seed-sequence-element modifier signals.

In such an embodiment, it is noted that a verify-seed-sequence button is absent from the user interface 1404. In such an embodiment, the trusted accessory compares the current seed sequence as modified by a received seed-sequence-element-modifier signal in response to receipt of the received seed-sequence-element-modifier signal. In this manner, after any seed-sequence-element-modifier signal is received by the trusted device, the trusted device compares the modified seed sequence with a stored access sequence and makes a determination with regard to whether or not to grant or to deny operational access based on the comparison.

Figure 15:
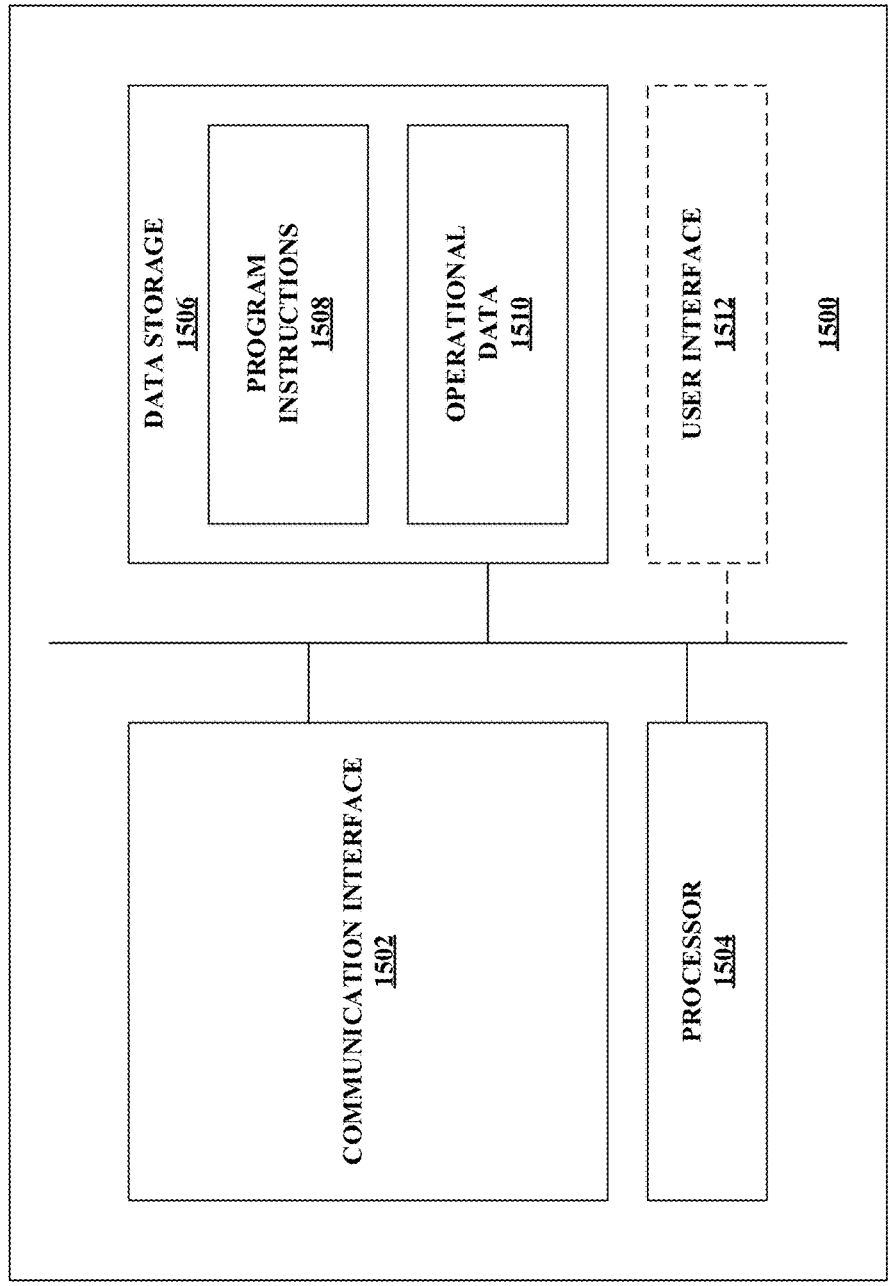
FIG. 15 depicts an example computing and communication device (CCD), in accordance with an embodiment.

FIG. 15 depicts an example computing and communication device (CCD), in accordance with an embodiment. In the embodiment that is depicted in FIG. 15, an example CCD 1500 includes a communication interface 1502, a processor 1504, and data storage 1506 containing instructions 1508 executable by the processor 1504 for causing the CCD 1500 to carry out a set of functions, which may include those functions described above in connection with FIG. 1 and other functions described herein. As a general matter, the example CCD 1500 is presented as an example system that could be programmed and configured to carry out the functions described herein.

The communication interface 1502 may include one or more wireless-communication interfaces (for communicating according to, e.g., APCO P25, TETRA, DMR, LTE, Wi-Fi, NFC, Bluetooth, and/or one or more other wireless-communication protocols) and/or one or more wired-communication interfaces (for communicating according to, e.g., Ethernet, USB, eSATA, IEEE 1394, and/or one or more other wired-communication protocols). As such, the communication interface 1502 may include any necessary hardware (e.g., chipsets, antennas, Ethernet cards, etc.), any necessary firmware, and any necessary software for conducting one or more forms of communication with one or more other entities as described herein. The processor 1504 may include one or more processors of any type deemed suitable by those of skill in the relevant art, some examples including a general-purpose microprocessor and a dedicated digital signal processor (DSP).

The data storage 1506 may take the form of any non-transitory computer-readable medium or combination of such media, some examples including flash memory, read-only memory (ROM), and random-access memory (RAM)

to name but a few, as any one or more types of non-transitory data-storage technology deemed suitable by those of skill in the relevant art could be used. As depicted in FIG. 15, the data storage 1506 contains program instructions 1508 executable by the processor 1504 for carrying out various functions, and also contains operational data 1510, which could include any one or more types of data stored and/or accessed by the example CCD 1500 during operation. In embodiments in which a computing system such as the example CCD 1500 is arranged, programmed, and configured to carry out processes such as the example process that is described above in connection with FIG. 1, the program instructions 1508 are executable by the processor 1504 for carrying out those functions; in instances where other entities described herein have a structure similar to that of the example CCD 1500, the respective program instructions 1508 for those respective devices are executable by their respective processors 1504 to carry out functions respectively performed by those devices.

If present, the user interface 1512 may include one or more input devices (a.k.a. components and the like) and/or one or more output devices (a.k.a. components and the like). With respect to input devices, the user interface 1512 may include one or more touchscreens, buttons, switches, microphones, and the like. With respect to output devices, the user interface 1512 may include one or more displays, speakers, light emitting diodes (LEDs), and the like. Moreover, one or more components (e.g., an interactive touchscreen-and-display component) of the user interface 1512 could provide both user-input and user-output functionality. And certainly other user-interface components could be used in a given context, as known to those of skill in the art. Furthermore, the CCD 1500 may include one or more video cameras, depth cameras, 3-D cameras, infrared-visible cameras, light-field cameras or a combination thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at an accessory to a communication device, an accessory-access-request event associated with authenticating a connection between the accessory and the communication device;
generating an access sequence within the accessory, the access sequence to enable the communication device to exchange encrypted data with the accessory;
performing an authentication protocol including:
generating a seed sequence having a plurality of seed-sequence elements;
the accessory, responsive to detecting the accessory-access-request event, outputting, via a user interface of the accessory, an indication of at least one seed-sequence element of the generated seed sequence;
receiving, at the accessory from the communication device, at least one seed-sequence-element-modifier signal for at least one of the seed-sequence elements associated with an outputted indication;
modifying, at the accessory, the seed sequence in accordance with the at least one received seed-sequence-element-modifier signal;
comparing, at the accessory, the modified seed sequence with the access sequence;
if the modified seed sequence matches the access sequence, the accessory granting the communication device operational access to the accessory and responsive to operational access being granted, the accessory exchanging encrypted data with the communication device; and
if the modified seed sequence does not match the access sequence, the accessory denying the communication device operational access to the accessory.

2. The method of claim 1, wherein the accessory is selected from the group consisting of (i) an audio-output accessory, (ii) a visual-output accessory, and (iii) a haptic-output accessory.

3. The method of claim 1, wherein each seed-sequence element is part of an ordered set.

4. The method of claim 3, wherein at least one seed-sequence element is an element selected from the group consisting of (i) a number, (ii) an alphabetical character, (iii) a color in an ordered set of colors, (iv) an image in an ordered set of images, and (v) a sound in an ordered set of sounds.

5. The method of claim 3, wherein at least one of the at least one seed-sequence-element-modifier signals comprises an increment-seed-sequence-element command.

6. The method of claim 5, wherein modifying the seed sequence in accordance with a received increment-seed-sequence-element command comprises incrementing a corresponding seed-sequence element.

7. The method of claim 3, wherein at least one of the at least one seed-sequence-element-modifier signals comprises a decrement-seed-sequence-element command.

8. The method of claim 7, wherein modifying the seed sequence in accordance with a received decrement-seed-sequence-element command comprises decrementing a corresponding seed-sequence element.

9. The method of claim 1, wherein at least one of the at least one seed-sequence-element-modifier signals comprises an output-different-element command.

10. The method of claim 9, wherein modifying the seed sequence in accordance with a received output-different-element command comprises outputting an indication of a random seed-sequence element.

11. The method of claim 1, wherein modifying the seed sequence comprises modifying the seed sequence on an element-by-element basis.

12. The method of claim 1, wherein outputting, via the user interface of the accessory, the indication of the at least one seed-sequence element comprises outputting an audible indication of the at least one seed-sequence element.

13. The method of claim 1, wherein outputting, via the user interface of the accessory, the indication of the at least one seed-sequence element comprises outputting a visual indication of the at least one seed-sequence element.

14. The method of claim 1, wherein outputting, via the user interface of the accessory, the indication of the at least one seed-sequence element comprises outputting the indication of the at least one seed-sequence element prior to receiving any seed-sequence-element-modifier signal.

15. The method of claim 1, wherein outputting, via the user interface of the accessory, the indication of the at least one seed-sequence element comprises alternating between outputting each seed-sequence element and receiving the corresponding seed-sequence-element-modifier signal.

16. The method of claim 1, further comprising outputting an indication of an updated value of a seed-sequence element as modified in response to a received seed-sequence-element-modifier signal.

17. The method of claim 1, wherein comparing the modified seed sequence with the access sequence comprises comparing the modified seed sequence with the access sequence in response to modifying the seed sequence.

18. The method of claim 1, wherein comparing the modified seed sequence with the access sequence comprises comparing the modified seed sequence with the access sequence in response to receiving a validate-modified-seed-sequence command.

19. An apparatus comprising a non-transitory computer-readable medium having instructions stored thereon that when executed cause a processor to:
receive, at an accessory to a communication device, an accessory-access-request event associated with authenticating a connection between the accessory the communication device;
generate an access sequence within the accessory, the access sequence to enable the communication device to exchange encrypted data with the accessory;
performing an authentication protocol including:
generating a seed sequence having a plurality of seed-sequence elements;
output, via a user interface of the accessory, an indication of at least one seed-sequence element of seed sequence;
receive, at the accessory from the communication device, at least one seed-sequence-element-modifier signal for at least one of the seed-sequence elements associated with an outputted indication;
modify, at the accessory, the seed sequence in accordance with the at least one received seed-sequence-element-modifier signal;
compare, at the accessory, the modified seed sequence with the access sequence;
if the modified seed sequence matches the access sequence, the accessory to grant the communication device operational access to the accessory and responsive to operational access being granted, the accessory exchanging encrypted data with the communication device; and if the modified seed sequence does not match the access sequence, the accessory to deny the communication device operational access to the accessory.

* * * * *